(12) United States Patent
Nendell

(10) Patent No.: US 11,070,368 B2
(45) Date of Patent: Jul. 20, 2021

(54) SYSTEM, METHOD, AND PROGRAM FOR TRANSMITTING AND RECEIVING ANY TYPE OF SECURE DIGITAL DATA

(71) Applicant: Dycrav Security Incorporated, Las Vegas, NV (US)

(72) Inventor: Donald F. Nendell, Las Vegas, NV (US)

(73) Assignee: Dycrav Security Incorporated, Las Vegas, NV (US)

( * ) Notice: Subject to any disclaimer, the term of this patent is extended or adjusted under 35 U.S.C. 154(b) by 151 days.

(21) Appl. No.: 16/562,877

(22) Filed: Sep. 6, 2019

(65) Prior Publication Data
US 2020/0084030 A1 Mar. 12, 2020

Related U.S. Application Data

(60) Provisional application No. 62/729,715, filed on Sep. 11, 2018.

(51) Int. Cl.
*H04L 29/06* (2006.01)
*H04L 9/08* (2006.01)
*H04L 9/32* (2006.01)

(52) U.S. Cl.
CPC ............ *H04L 9/0844* (2013.01); *H04L 9/085* (2013.01); *H04L 9/0825* (2013.01); *H04L 9/3228* (2013.01); *H04L 2209/38* (2013.01)

(58) Field of Classification Search
CPC ..... H04L 9/0844; H04L 9/3228; H04L 9/085; H04L 9/0825; H04L 2209/38;
(Continued)

(56) References Cited

U.S. PATENT DOCUMENTS 6,728,378 B2   4/2004  Garib
6,748,367 B1*  6/2004  Lee ..................... G06Q 20/06
                                                   705/21

(Continued)

OTHER PUBLICATIONS

The Future of Identity, 1 pages, IBM Corporation 2018.
(Continued)

*Primary Examiner* — Mahfuzur Rahman
(74) *Attorney, Agent, or Firm* — Howard & Howard Attorneys PLLC

(57) ABSTRACT

A system for transmitting and receiving digital data includes a database including a plurality of user records and an application server. Each user of the records includes a plurality of user profiles, each of the user profiles includes a unique user ID and a unique password, each user of the profiles is associated with at least one PrivaKey/ChannelKey. The application server is programmed to execute a program including the steps of verifying a first user profile and a second user profile, authenticating the first user profile and the second user profile, receiving a PrivaKey/ChannelKey associated with the first user profile and the second user profile, automatically encrypting a plurality of digital data, sending the encrypted digital data to the second user profile, rebuilding the secret key from the ReciKey to prepare the encrypted digital data, automatically decrypting the encrypted digital data, and displaying the decrypted digital data.

20 Claims, 16 Drawing Sheets

(58) Field of Classification Search
CPC . H04L 63/083; H04L 63/067; H04L 63/0435; H04L 9/3239; H04L 9/0861; H04L 9/3226
See application file for complete search history.

(56) References Cited

U.S. PATENT DOCUMENTS

| | | | |
|---|---|---|---|
| 7,840,993 | B2 | 11/2010 | Ganesan et al. |
| 9,100,186 | B2 | 8/2015 | O'Hare et al. |
| 9,166,782 | B2 | 10/2015 | Boren et al. |
| 9,258,296 | B2 | 2/2016 | Juthani |
| 9,530,013 | B2 | 12/2016 | Bobinski et al. |
| 10,015,154 | B2 | 7/2018 | Tunnell et al. |
| 10,243,741 | B2 | 3/2019 | Cohen et al. |
| 2016/0140335 | A1* | 5/2016 | Proulx .............. H04L 63/083 726/6 |
| 2016/0256141 | A1 | 9/2016 | Yau et al. |
| 2017/0293766 | A1* | 10/2017 | Schnjakin ........... G06F 21/335 |
| 2019/0081796 | A1 | 3/2019 | Chow et al. |
| 2019/0356650 | A1* | 11/2019 | Leavy ............... H04L 63/0815 |
| 2020/0341689 | A1* | 10/2020 | Smith ................ G06F 3/0683 |
| 2021/0072378 | A1* | 3/2021 | Shin ................... G01S 15/88 |

OTHER PUBLICATIONS

Long, Colleen, New Homeland Security center to guard against cyberattacks, AP News, Jul. 31, 2018, 7 pages.
Schneier, Bruce, NSA surveillance: A guide to staying secure, The Guardian, Sep. 6, 2013, 6 pages.
Zero Trust: Trust No One, panda security, Mar. 7, 2018, 9 pages.
Allor, Peter, 2017 Cost of Data Breach Study: Global Overview, IBM Security, Jun. 2017, 27 pages, Ponemon Institute.
Stubbs, Rob, Quantum Computing and its Impact on Cryptography, CRYPTOMAThIC, Apr. 29, 2018, 11 pages.
De Groot, Juliana, The History of Data Breaches, Digital Guardian, Oct. 24, 2019, 26 pages.
Ismail, Nick, The Internet of Things: The security crisis of 2018?, Jan. 22, 2018, 5 pages.
Cunningham, Chase et al., The Forester Wave: Zero Trust eXtended (ZTX) Ecosystem Providers, Q4 2018, Tools and Technology: The Security Architecture and Operations Playbook, Forrester, Nov. 8, 2018, 15 pages.
Weise, Elizabeth, USA Today's list of the biggest data breaches and hacks of all time, USA Today, Oct. 3, 2017 (updated Jul. 30, 2019), 2 pages.
World's Biggest Data Breaches & Hacks, Information is Beautiful, Apr. 1, 2019, 6 pages.
Acohido, Byron et al., 2017 Cybersecurity Report Card, Security Professionals Rate Their Maturity and Share Best Practices, DomainTools, 2017, 8 pages.
2017 Norton Cyber Security Insights Report Global Results, Symantec Corporation, 2018, 30 pages.
Savvides, Nick, 2018 Cyber Security Predictions, Symantec Blogs, Dec. 6, 2017, 5 pages.
Bekker, Garrett, 2018 Thales Data Threat Report, Thales, 451 Research, Global Edition, 32 pages.
Baker, Al, An 'Iceberg' of Unseen Crimes: Many Cyber Offenses Go Unreported, The New York Times, Feb. 5, 2018, 4 pages.
Schneier, Bob, How the Supreme Court could keep police from using your cellphone to spy on you, The Washington Post, Nov. 27, 2017, 7 pages.
Lovelace Jr., Berkeley, Cost of data breaches hits $4 million on average: IBM, CNBC, Jun. 15, 2016, 10 pages.
Credential Stuffing: A Security Epidemic, f5, 9 pages.
Lazarus, David, Cybersecurity Incidents Spark the Call for Encrypted Data, gt News, Oct. 4, 2017, 8 pages.
Cunningham, Chase et al., The Zero Trust eXtended (ZTX) Ecosystem, Extending Zero Trust Security Across Your Digital Business, Forrester, Jan. 19, 2018, 15 pages, Forrester Research, Inc.
Hayden, Ernie, Data breach protection requires new barriers, TechTarget Network, 9 pages.
2017 Data Breach Investigations Report, 10th Edition, verzion, 76 pages.

* cited by examiner

| User ID | Password | Access Code | PrivaKey |
|---------|----------|-------------|----------------|
| Username1 | Password1 | 1234 | 123-456-789-00 |
| Username2 | Password2 | 5678 | 567-890-123-44 |
| Username3 | Password3 | 9012 | 901-234-567-88 |

FIG. 5

| Action Record ID | Triggering Event | Action Event Data | Action Event |
|---|---|---|---|
| Action001 | Receive a Username and Password | Determine whether the username and password received are correct | Application Server Event |
| Action002 | Receive a Correct Username and Password | Ask and Determine whether the access code received is correct | Application Server Event |
| Action003 | Receive a Correct Access Code | Pair the PrivaKey with the correct user profile | Application Server Event |
| Action004 | Prepare a user profile to send a message to be sent | Compile a PrivaKey, a ReciKey and encrypted digital data to be sent to a user | Application Server Event |
| Action005 | Prepare digital data to be sent | Send the message to a user with the PrivaKey, the ReciKey, and the encrypted digital data | Application Server Event |
| Action006 | Send digital data to a user | Receive a secret key sent with the digital data | Application Server Event |
| Action007 | Receive digital data from the Application Server | Decrypt the Encrypted digital data | Application Server Event |
| Action008 | Verify or authenticate the secret key | Display the Decrypted digital data | Application Server Event |

FIG. 6

| User ID | Action Record ID | Event Trigger | Action Rule File | Rule Description | Notification Message File |
|---|---|---|---|---|---|
| Username1 | Action001 | Receive a Username and Password | Action001.API | Determine whether the username and password received are correct | InfoMessage001 |
| Username1 | Action002 | Receive a Correct Username and Password | Action002.API | Ask and Determine whether the access code received is correct | InfoMessage002 |
| Username1 | Action003 | Receive a Correct Access Code | Action003.API | Pair the PrivaKey with the correct user profile | InfoMessage003 |
| Username1 | Action005 | Prepare digital data to be sent | Action005.API | Send the digital data to a user with the PrivaKey, the ReciKey, and the encrypted digital data | InfoMessage005 |
| Username1 | Action006 | Send digital data to a user | Action006.API | Receive a secret key sent with the digital data | InfoMessage006 |
| Username1 | Action007 | Receive the digital data from the Application Server | Action007.API | Decrypt the Encrypted digital data | AlertMessage007 |

FIG. 7

SYSTEM, METHOD, AND PROGRAM FOR TRANSMITTING AND RECEIVING ANY TYPE OF SECURE DIGITAL DATA

CROSS-REFERENCE TO RELATED APPLICATIONS

This application claims the benefit of U.S. Provisional Patent Application Ser. No. 62/729,715, filed on Sep. 11, 2018, the disclosure of which is hereby incorporated by reference in its entirety.

FIELD OF THE INVENTION

The present invention relates generally to a system, a method, and a computer-readable storage and exchange medium for improved security and safety and, in particular, to a system, a method, and a computer-readable storage and exchange medium for dynamic encryption and decryption of any type of digital data.

BACKGROUND OF THE INVENTION

In the era of "Need for Speed," today the need for security has never been greater, and the age old adage remains true that security systems have to win every time, the attacker only has to win once. Security pros are still scrambling for new and effective ways to protect their networks and combat the impacts of hacking and exploitation. As early as May 2013, Ernie Hayden (*Tech Target*) stated in an article, Data breach protection requires new barriers, that, "[a]ssumption of breach is the new norm." In addition, Nate Lord (*Digital Guardian: Data Insider Blog*) stated as late as Apr. 6, 2018 in *The History of Data Breaches* that, "the reactive approaches of yesterday simply don't cut it in the modern threat landscape."

As originally proposed in 2010, the Zero Trust (ZT) model called for total distrust of everything, no matter the origin, basically, "Trust No One." However, in Forrester's (Jan. 19, 2018) report entitled: *The Zero Trust eXtended (ZTX) Ecosystem: Extending Zero Trust Security Across Your Digital Business*, they state, there are five areas to control in Zero Trust: Data, People, Networks, Workloads, and Devices. Panda specifically states in an Adoptive Defense article, *Zero Trust: Trust No One* (Mar. 7, 2018) that to achieve a ZT (or ZTX) model, one should maintain exhaustive control of authentication, as well as of identity management and encryption.

Know the Odds: We've all heard that when it comes to experiencing a data breach, the question is not if it will happen, but when. *The Symantec* 2018 *Cybersecurity Predictions Report* predicts that cyber criminals will use artificial intelligence (AI) and machine learning (ML) to conduct attacks. Also, that 2018 is the first year where we will see AI versus AI in a cybersecurity context where cyber criminals will use AI to attack and explore victims' networks.

When it comes to experiencing a data breach according to *Ponemon Institute's* 2017 *Cost of Data Breach Study: Global Overview*, those odds are as high as 1 in 4. Therefore, organizations must understand the probability of being attacked, how it affects them and, even more importantly, which factors can reduce or increase the impact and cost of a data breach.

A (Dec. 1, 2017) 9-page SC Media Publications eBook, *Bank Fraud for the Holidays*, co-sponsored by IBM, states that 69% of customers are less inclined to do business with an organization that has suffered a security breach. *The IBM Future of Identity Study* (Jan. 29, 2018) states that in an era where personal information is no longer private, and passwords are far from unbreakable, the future of identity is now everyone's personal business. Plus, worldwide noted security guru Bruce Schneier states (Nov. 27, 2017) that, the cellphones we carry with us constantly are the most perfect surveillance device ever invented, and our laws have not caught up to that reality yet. Al Baker (*The New York Times*) wrote in an article (Feb. 5, 2018) entitled, *An 'Iceberg' of Unseen Crimes: Many Cyber Offenses Go Unreported* concurs in that the tools used to fight crime and measure crime trends in the United States are outdated and, because so many occur online and have no geographic borders, local police departments face new challenges not only fighting them, but also keeping track of them. He goes on to quote Nola Joyce, a former deputy commissioner of Philadelphia's police department who said, "there's an old saying that came out of the Vietnam War, that said, '[i]f you can't measure what matters, what you measure matters a great deal.'" Adding to that dilemma, according to Intel, 97% of people around the world are "even" unable to identify a sophisticated phishing e-mail.

According to a DOMAINTOOLS 2017 Cyber Security Report, more than one in four organizations have been breached in the past 12 months, while 23% of the organizations are not even sure if they have been breached or not. Further, of the malware attacks that have infiltrated organizations' networks, KnowBe4 reports that 67% have entered through e-mail and 63% through web surfing. In addition, unwanted and evasive applications can have serious consequences for the security and performance of networks. Veracode concurs and states that web and mobile applications account for more than a third of all data breaches.

An f5 Credential Stuffing: A Security Epidemic Report states that the world set a new record for data breaches in 2017, with more than 4.2 billion exposed records. In just the first six months of 2017 alone there were 2,227 breaches reported, and the majority included stolen usernames and passwords. Additionally, as many as 978 million people in 20 countries lost money to cybercrime in 2017 according to the 2017 Norton Cyber Security Report.

A 2017 Government Technology magazine article: Cybersecurity Incidents Spark the Call for Encrypted Data stated that, "data, whether held by private industry or the public sector, continues to face threats to its security." Gartner estimates that by 2018, 25% of corporate data traffic will bypass perimeter security and flow directly from mobile devices to the cloud. Also, 49% of the workforce is already mobile and 68% of workloads will be in public cloud data centers by 2020.

From 2005 to present day (2018), the Privacy Rights Clearinghouse reports that a total of 10,062,311,348 U.S. records have been breached; 1.923 billion U.S. records lost in 2017 alone, up from 7,885 U.S. data breaches made public in 2005.

Thales eSecurity proclaims that data breaches are the new reality. In the just released 2018 Thales Data Threat Report—Global Edition from 451 research, they state that 67% of global enterprises have now been breached—73% in the USA alone, and over half of these have been breached in the last year (36%)—also that, 47% of those breached this year had been breached in the past. They further state that 94% of organizations are using sensitive data in cloud, big data, IOT, containers or mobile environments—thus creating new attack surfaces and new risks for data even as their traditional data repositories are increasingly at risk.

A recent Sophos survey showed that on average 60% of network traffic is going unidentified across firewalls. *The 2017 Verizon Data Breach Investigations Report* found that 51% of cyberattacks are malware-free. While, Entrust Datacard says that 81% of hacking-related breaches come from either weak and/or stolen passwords.

As reported by CNBC on June 2016, according to the Ponemon Institute's annual *Cost of a Data Breach Study for 2016*, the average cost of a data breach hit $4(US) million, representing a 29% increase since 2013, which totals out to approximately $158 for every lost or stolen record. According to Apex Technologies, the estimated average cost of the breach of a data record in 2018 will be $250 and the estimated average damage to an organization will be $8 million.

Visual Capitalist says the fact that more and more of our data is being stored in the cloud and among devices on the Internet of Things (IOT) means that increasingly sensitive types of data are now more vulnerable than ever to being hacked. They further state this looks to be even more cause for concern than the rapidly rising volume of records that have been exposed, whether intentionally or by accident.

Nick Ismail writes in his article, *The Internet of Things [IOT]: The Security Crisis of 2018?* (*Information Age*), Jan. 22, 2018, that IOT, the ability of everyday devices to connect and transfer data to each other, is already carving out a place in the consumer market, with devices like smart home locks, thermostats, lighting and energy monitors. However, with the IOT bandwagon rushing full steam ahead, few vendors or customers are pausing to consider the enormous security risks associated with the devices. By 2020, it is estimated that 25% of cyber-attacks will target IOT devices (which are commonly forecast to be 25-30 billion devices worldwide by the early 2020's). The current IOT landscape can be compared to the early days of the Internet, when viruses, worms, and email spam plagued users. Many companies raced to join the Internet "gold rush" without necessarily considering the importance of interne security. IOT manufacturers need a call to action, to consider the consequences of their actions today. Ismail further proclaims that in 2018, standardization on IOT devices is a must. It is essential that devices are secure by design, rather than included as an afterthought [or suffer the consequences].

Data Insider stated in *The History of Data Breaches* (January 2018) that most breaches are carried out by hackers, which illustrates that data breaches are becoming more widespread—and having a much larger impact, compromising millions of records containing sensitive consumer, company, or user data. With even the world's largest companies suffering massive data breaches impacting millions of consumers, modern enterprises require a comprehensive, full-circle approach to data protection and security. The reactive approaches of yesterday simply do not cut it in the modern threat landscape. And, in the corporate blame game, according to SYNOPSYS, 40% of big companies and 53% of small companies believe software development teams are responsible for security.

In USA Today's list of the biggest data breaches and hacks of all time, they state that data breaches have become a fact of digital life and they seem to be getting bigger. Note, Uber paid hackers $100,000 in November 2017 (Hint: Uber's only #12 on the list) to hide a year-old breach of 57 million users. Yahoo! (#1 on the list) had 3 billion users reported breached as of December 2017.

The team at Information is Beautiful assembled a fascinating visualization of the world's biggest data breaches, highlighting some of the most high-profile attacks between 2004 and 2017. The graphic shown as the World's Biggest Data Breaches, Selected losses greater than 30,000 records (updated Jan. 5, 2018) is really quite awe inspiring as it rearranges the bubble size to illustrate different aspects of all of the different breaches.

Kevin Mitnick, the self-proclaimed "World's Greatest Hacker," demonstrated live (and on stage at CeBIT 2018) that fiber-optic cable can be hacked (re: YouTube Video), thus reinforcing the oft-quoted edict that, "only end-to-end encryption remains safe!" Therefore, when you encrypt digital data, an e-mail text, or phone call, use end-to-end encryption, meaning the digital data stays unreadable until it reaches its intended recipient. It also goes without saying, "encrypt your hard drive and important files as well, and back them up off site."

Concerning data in transit, as secure HTTPS becomes more pervasive, it is worth asking why should an organization use end-to-end encrypt data when HTTPS is pretty secure? The answer is that HTTPS is an important but a small piece of the crypto puzzle. Organizations determining what additional security requirements are needed should start the process by answering a few key questions: How many times does data get decrypted and re-encrypted in its journey from one user to another? How many systems are allowed access to the plain text along the way? How many departments are responsible for this journey? The answers to these questions display the limitations of HTTPS. Using HTTPS, scammers can make fraudulent sites appear secure, leading users to assume that it is safe to enter personal data or credit card information. Even if a user is using HTTPS, the user cannot say that the data is being encrypted.

Secret-Key cryptography or symmetric-key encryption (SE) refers to any encryption method in which a single key (the secret-key) known to both the sender and recipient, is used to both encrypt and decrypt information. Symmetric encryption algorithms, as referred to herein, are algorithms utilizing a single one-time-use only (OTU) secret key to encrypt and decrypt particular digital information.

Public key cryptography (PKI), also known as asymmetrical cryptography, provides a highly secure method of encryption and decryption using two keys, a public key and a private key. Encryption is performed using one of the keys with a public key algorithm. Data encrypted with the public key algorithm can only be decrypted with the private key. Similarly, data encrypted with the private key can only be decrypted with the public key.

For the same key size, typically the asymmetrical encryption is less secure. This is offset in PKI by using larger keys, and consequently, greater computational power being required. In any particular algorithm, it is important to consider a specific key size, and not a comparison between the types of encryption algorithms or methods. For example, RSA (an asymmetrical encryption standard using a private and public key) verses AES (the advanced encryption standard using a secret key).

When deciding a cryptographic primitive for a given purpose, the decision making process may be described as: (i) what algorithm(s) will do the job; (ii) what strength does the user need; and, (iii) given the constraints (brute speed, latency, memory efficiency, cost, CPU intensive, etc.), which choice is best for the user's needs? In practicality, symmetric and asymmetric encryptions are distinct operations that operate in distinct contexts for distinct usages and distinct attack models. The process for asymmetric encryption is more demanding, because it is about realizing encryption and being able to publish the ways to encrypt (i.e., the public key) without revealing the ways to decrypt (i.e., the private key). A practical PKI implementation needs mathematics and computer processing power, whereas symmetric encryption is about scrambling the data, which includes less mathematics and computational power (i.e., CPU) being involved.

Asymmetrical encryption requires a certifying authority, and in some cases requires even a verifying authority, both of which have been compromised in the past. In contrast, symmetrical encryption does not require a certifying or a verifying authority.

Encryption with Transport Layer Security (TLS) keeps prying eyes away from user digital data while the digital data is in transit. TLS protocol encrypts and delivers mail securely, for both inbound and outbound mail traffic. TLS helps prevent eavesdropping between mail servers—keeping user digital data private while the digital data moves between e-mail providers. In order to use TLS to encrypt the digital data being sent back and forth, the users must both use e-mail providers that support TLS. Here, the critical question to be answered is who ultimately holds or has possession of the encryption/decryption key(s)? The difference ultimately lies in the PKI versus SE comparison.

Quantum Computing: the future of computing. According to an article entitled: An Invisible Military Arms Race: Players in a new intelligence theater with major implications for the cyber world and all users of the Internet (*Eye Spy Magazine, Volume XV, Number Three* 2018 (*Issue* 15), May 2018, page 48), quantum computing is a global endeavor. With the possible benefits of quantum computing self-evident, there are multiple players, including Russia, China, US, Canada, Japan, Israel and Europe (who alone is investing about a billion dollars into its Quantum Technologies Flagship Program).

Ian Levy, from the British National Cyber Security Center (NCSC), an agency within GCHQ, believes, as do many others, that perfecting quantum computing will take 20-years to perfect. Much of this is due to cost. He states that, "if a state has invested a huge amount in a quantum computer, the logical thing [to do] is to attack cryptosystems."

The good news is that not all encryption will be broken in the quantum world, some algorithms that do not use factorization as their mathematical base will remain robust. Symmetrical algorithms will still be cryptographically secure, as long as their keys are doubled in length. Inventing new algorithms will take time, but the vetting selection, adoption, standardization, and rollout will take even longer, which is the biggest concern. Analysts all agree that it is important to keep up to date with the fast-paced development in quantum computing.

Rob Stubbs writes in Quantum Computing and its Impact on Cryptography (*Cryptomathic*), Apr. 29, 2018, that Symmetric algorithms used for encryption, like AES, are still thought to be safe (with sufficient key length—e.g., AES-256 or larger). However, current asymmetric algorithms like RSA and ECDSA will be rendered essentially useless once quantum computers reach a certain scale. This will break nearly every practical application of cryptography in use today, making e-commerce and many other digital applications that we rely on in our daily lives totally insecure.

It should be noted that much encrypted information that is around today, or over the coming years, will probably be susceptible to decryption one day in the future once quantum computers are generally available—all an attacker needs to do is capture the encrypted data today, including the initial key exchange handshake, then wait until they have a quantum computer powerful enough to break it within a reasonable amount of computing time.

In his article, *Quantum Computing and its Impact on Cryptography, Cryptomathic* (Apr. 29, 2018) Robb Stubbs states: "Commercial organizations with sensitive data that they wish to protect in the long term and that are attractive targets for hackers should look to use symmetric algorithms with long key lengths (e.g., AES-256 rather than AES-128 or 3DES) as soon as possible; and, where Diffie-Hellman is used to negotiate symmetric keys, use perfect forward secrecy techniques to minimize the amount of data protected under each key. They should also look to migrate to quantum-resistant algorithms sooner rather than later. For the most paranoid, safety can be found by eliminating the use of public key cryptography entirely and relying purely on symmetric cryptography. However, that introduces a different and perhaps more problematic security challenge, i.e., the secure sharing of secret key material. Perhaps quantum key distribution will provide the solution to that?"

In Conclusion, in a National report by Deb Riechmann, The Associated Press, (Jul. 27, 2018), according to a government report just released, "Foreign economic and industrial espionage against the United States continues to represent a significant threat to America's prosperity, security, and competitive advantage." Cyberespionage is a relatively low-cost, high-yield way to access and acquire information from U.S. research institutions, universities and corporations, the report said. More vulnerabilities will emerge with the increase in cloud computing, artificial intelligence, and the proliferation of vehicles, home appliances, medical devices and other items connected to the Internet. Cyber operations are the preferred method for conducting economic espionage, the report said, but U.S. adversaries also acquire sensitive information by hiring sophisticated hackers, recruiting spies or gleaning material from foreign students studying at American universities.

Bill Evanina, the nation's top counterintelligence official and director of the center, told reporters at a briefing, "Our economic security is our national security. We cannot just get numb to our adversaries stealing our intellectual property."

Michael Moss, deputy director of the government's Cyber Threat Intelligence Integration Center, said incidents of economic espionage are growing rapidly. "The thing that continues to surprise me is how fast it continues to accelerate. It's getting faster and faster," he said.

In an article entitled: New Homeland Security Center to Guard Against Cyberattacks by Colleen Long, Associated Press (Jul. 31, 2018), Ms. Long reported that the U.S. Dept. of Homeland Security Secretary Kirstjen Nielsen while speaking at a cybersecurity summit announced today the creation of the National Risk Management Center at the department. The Center is aimed at guarding energy companies, banks and other industries against cyberattacks. Nielsen warned that: 1) the growing cyber threat cannot be underestimated; 2) government and the public must work together to battle it; 3) our country is "facing an urgent crisis in cyberspace;" and, 4) cyber threats now "exceed the dangers of physical attacks" against the U.S.

Bottom Line: The only way to beat the hackers—who will get in—is anything and everything of interest—to anyone and everyone at all—must be encrypted. That way when the hackers eventually do get in all they will find is GIGO (Garbage In [equals] Garbage Out). The simple solution to the problem is encryption. Encryption just has to: 1) get better and easier to use; 2) be used religiously; and 3) be used worldwide ubiquitously. Only then will we win the war against hackers! In the meanwhile, encryption, and how it is applied, just got better.

Symmetric-Key Based Cryptography

There are a few issues with current encryption algorithms and technologies. First, consumers have a false sense of security that their communications between devices, documents stored, and digital data are secure. Next, some of the encryption algorithms are very complex and too difficult for the wide spread consumers to use. In addition, the key exchange is cumbersome and difficult to keep secured. In addition, consumers rely on the manufacturer of hardware devices and software to protect their privacy, which is also becoming a major issue between government and business.

According to Wikipedia circa 2018, as a general rule, for 128 bits of security in a symmetric-key-based system, one can safely use key sizes of 256 bits. The best quantum attack against generic symmetric-key systems is an application of Grover's algorithm, which requires work proportional to the square root of the size of the key space. It is clear that symmetric-key systems offer the smallest key (and safest) sizes for post-quantum cryptography.

As to the answer of the critical question of who ultimately holds and/or uses or has possession of any encryption/decryption key(s) used in the present invention; each and every individual user/holder of the present invention is held legally, ultimately, solely, and totally accountable and responsible for the safety/security/use/transport/secure storage of each and every ChannelKey in his/her possession, and no one else.

Bottom Line: according to Edward Snowden, a former NSA employee and subsequent whistle-blower (circa 2013), and later confirmed by Security Guru Bruce Schneier in his article entitled: NSA surveillance: A guide to staying secure, (*The Guardian*), (Sep. 6, 2013), states that, "the NSA has huge capabilities—and if it wants into your computer, it's in."

The present invention is aimed at one or more of the issues identified above.

SUMMARY OF THE INVENTION

The present invention implements a brand new, all-inclusive solution to the above acknowledged security issue(s) with a dynamic any (i) current and/or future browser-based secure digital data (i.e., Internet, extranet, etc.) communication system; (ii) digital communication device(s); (iii) operating system(s); and (iv) storage medium(s)/location(s), while using an OTU (i.e., One-Time-Use, throwaway, never replicated/re-used) symmetrical encryption-based (SE) secret key, auto-generating/recreating (end-to-end symmetrical encryption based), all-encompassing security system.

In addition, the present invention can securely protect all types of digital data "albeit in transit or stationary (at rest) anywhere, anytime", all-the-while using completely unknown to anyone, at any time, SE OTU (One-Time-Use) Secret Keys, with a "dynamic" two-factor authentication (2FA) guard standing at the gate.

One advantage of the present symmetrical encryption-based (SE) invention is that, the system, method, and processor for the computer media, end-to-end encrypts the data which is secure at each point throughout the process. Without the end-to-end crypto, accountability is spread across departments. In all embodiments of the present invention, the OTU SE secret key is: (i) never replicated; (ii) completely unknown to both the sender and the recipient of encrypted digital data; and (iii) automatically implemented by the program in the encryption and decryption phases of the digital data being securely stored and/or transmitted securely between qualified/authenticated users of the program.

The present invention provides a system for transmitting and receiving digital data that includes a database including a plurality of user records and an application server. Each of the user records includes a plurality of user profiles and each of the user profiles includes a unique user ID and a unique password associated with the user ID to authenticate the user profile. In addition, each of the user profiles is associated with at least one unique PrivaKey/ChannelKey. The application server is programmed to execute a program including the steps of verifying a first user profile and a second user profile, wherein the first user profile includes a first user ID and a first password to authenticate the first user profile and the second user profile includes a second user ID and a second password to authenticate the second user profile, authenticating the first user profile and the second user profile, receiving a PrivaKey/ChannelKey associated with the first user profile and the second user profile, wherein the first user profile and the second user profile are further authenticated via the PrivaKey/ChannelKey, automatically encrypting a plurality of digital data sent from the first user profile to the second user profile, wherein the encrypted digital data includes the PrivaKey/ChannelKey and a ReciKey, wherein the ReciKey includes a secret key, sending the encrypted digital data to the second user profile from the first user profile using the secret key, rebuilding the secret key from the ReciKey to prepare the encrypted digital data, upon rebuilding the secret key, automatically decrypting the encrypted digital data, and displaying the decrypted digital data for the second user profile.

In another embodiment, the present invention provides a method for transmitting and receiving digital data including the steps of accessing a database including a plurality of user records. Each of the user records includes a user profile and each of the user profiles includes a unique user ID and a unique password associated with the user ID to authenticate the user profile. In addition, each of the user profiles is associated with at least one unique PrivaKey/ChannelKey. The method further includes the steps of verifying a first user profile and a second user profile. The first user profile includes a first user ID and a first password to authenticate the first user profile and the second user profile includes a second user ID and a second password to authenticate the second user profile. The method further includes the steps of authenticating the first user profile and the second user profile and receiving a PrivaKey/ChannelKey associated with the first user profile and the second user profile. The first user profile and the second user profile are further authenticated via the PrivaKey/ChannelKey. The method further includes the steps of automatically encrypting a plurality of digital data sent from the first user profile to the second user profile. The encrypted digital data includes the PrivaKey/ChannelKey and a ReciKey and the Recikey includes a secret key. The method further includes the steps of sending the encrypted digital data to the second user profile from the first user profile using the secret key and rebuilding the secret key from the ReciKey to prepare the encrypted digital data. Upon rebuilding the secret key, the method includes the step of automatically decrypting the encrypted digital data and displaying the decrypted digital data for the second user profile.

In yet another embodiment, the present invention provides one or more non-transitory computer-readable storage media, having computer executable instructions embodied thereon, where when executed by at least one processor, the computer-executable instructions cause the processor to execute a program including the steps of accessing a database including a plurality of user records. Each of the user records includes a plurality of user profiles, and each of the user profiles includes a unique user ID and an unique password associated with the user ID to authenticate the user profile. In addition, each of the user profiles is associated with at least one unique PrivaKey/ChannelKey. The program further includes the step of verifying a first user profile and a second user profile. The first user profile includes a first user ID and a first password to authenticate the first user profile and the second user profile includes a second user ID and a second password to authenticate the second user profile. The program further includes the steps of authenticating the first user profile and the second user profile and receive a PrivaKey/ChannelKey associated with the first user profile and the second user profile. The first user profile and the second user profile are further authenticated via the PrivaKey/ChannelKey. The program further includes the step of automatically encrypting a plurality of digital data sent from the first user profile to the second user profile. The encrypted digital data includes the PrivaKey/ChannelKey and a ReciKey and the ReciKey includes a secret key. The program further includes the steps of sending the encrypted digital data to the second user profile from the first user profile using the secret key and rebuilding the secret key from the ReciKey to prepare the encrypted digital data. Upon rebuilding the secret key, the program further includes the steps of automatically decrypting the encrypted digital data and displaying the decrypted digital data for the second user profile.

One advantage of the present invention is that the system, method, and processor for the computer media end-to-end encrypts the data which is secure at each point of the process. Without the end-to-end crypto, accountability is spread across departments. In one embodiment of the present invention, the secret key is a password known to both the sender and the recipient of a message. In another embodiment of the present invention, the secret key has a value of a recipient's password, which value is known to the sender and which value can be generated by the recipient by applying a hashing algorithm to his/her password.

Other advantages of the present disclosure will be readily appreciated, as the same becomes better understood by reference to the following detailed description when considered in connection with the accompanying drawings.

BRIEF DESCRIPTION OF THE DRAWINGS

FIGS. 5-7 are illustrations of exemplary database records generated by the system of FIG.

DESCRIPTION OF THE PREFERRED EMBODIMENT(S)

Figure 1:
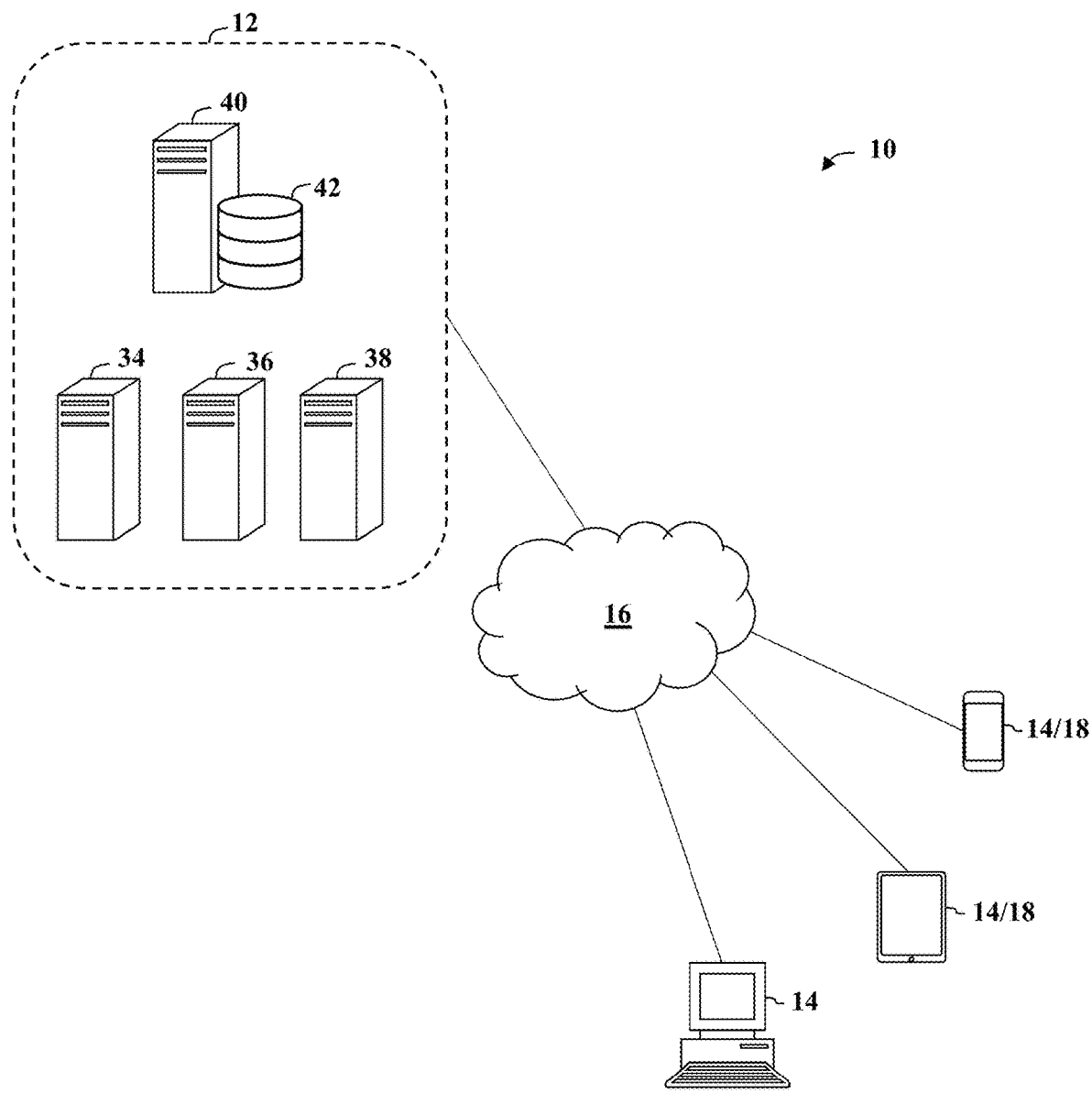
FIG. 1 is a schematic view of a system, according to the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a USB Flash Drive, a random access memory (RAM) device, a read-only memory (ROM) device, a reasonable programmable read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including, but not limited to, the Internet, a LAN, a cellular network, or any suitable communications link. The communications link may include one or more of a wired and wireless connection and may be always connected, connected on a periodic basis, and/or connected on an as needed basis.

In one embodiment, the present invention provides a multi-faceted/multi-factor identification, authentication, accreditation (verification), authorization, access and accommodation, "secure" digital data exchange and storage method, which is served as a web application from a hosted HTTPS application server, transiting over any type of Browser (Chrome, Firefox, Safari, Internet Explorer, et al.) to any Laptop/Desktop/Mobile Device, et al (Digital Device(s)).

There are differences between Asymmetric Encryption (AE), commonly known as, Public Key Infrastructure (PKI) and Symmetrical Encryption (SE). There is no specific way to compare the two algorithm methods of AE and SE. However, the only thing that is truly secure is a One Time Pad-Based (OTU) (i.e., truly random) XOR stream cipher (random based generator and exclusive operator), which is symmetric as described in more detail below, and the initial key exchange is a major problem. Examples of an AE algorithm, i.e., RSA and El Gammel, may be broken with quantum computing. The strength of a particular encryption algorithm is the number of attempts needed in order to break the encryption. Moreover, the strength is the amount of computational horsepower needed to be performed to ultimately process and decrypt encrypted data. In any particular encryption algorithm, it is important to consider a specific key size, not a comparison between the types of encryption algorithms or methods alike.

In various embodiments, a system 10 includes a networked computer system that is configured to generate information related to processing encrypted incoming and encrypted outgoing digital data between users. The system 10 includes a dynamic authentication method, an application software, and a PrivaKey/ChannelKey, described below. The system 10 includes application software that enables the system to provide a platform for users to send and receive secure digital data including encrypted data, a 2-factor dynamic authentication method, a cross platform accessibility to all users, and a PrivaKey/ChannelKey verification method.

In one embodiment, the application software provides the system 10 with a platform to allow users to send and receive encrypted digital data using a 2-factor dynamic authentication method. The system 10 allows physical access by all participating users to a secure line of communication that rests in accessing the hosting application software by a changeable username and password that is entered by the user and authenticated by the system 10 and each user dynamically authenticates their individual application software by entering an individual access code that is known only by each individual user. This access code may be changed at any time by the user. The access code may be changed to any length the user chooses, for example, the access code may be a 4 digit pin number or a 32 digit access code. In addition, the access code may include a duress capability which may erase the account once activated.

Figure 2:
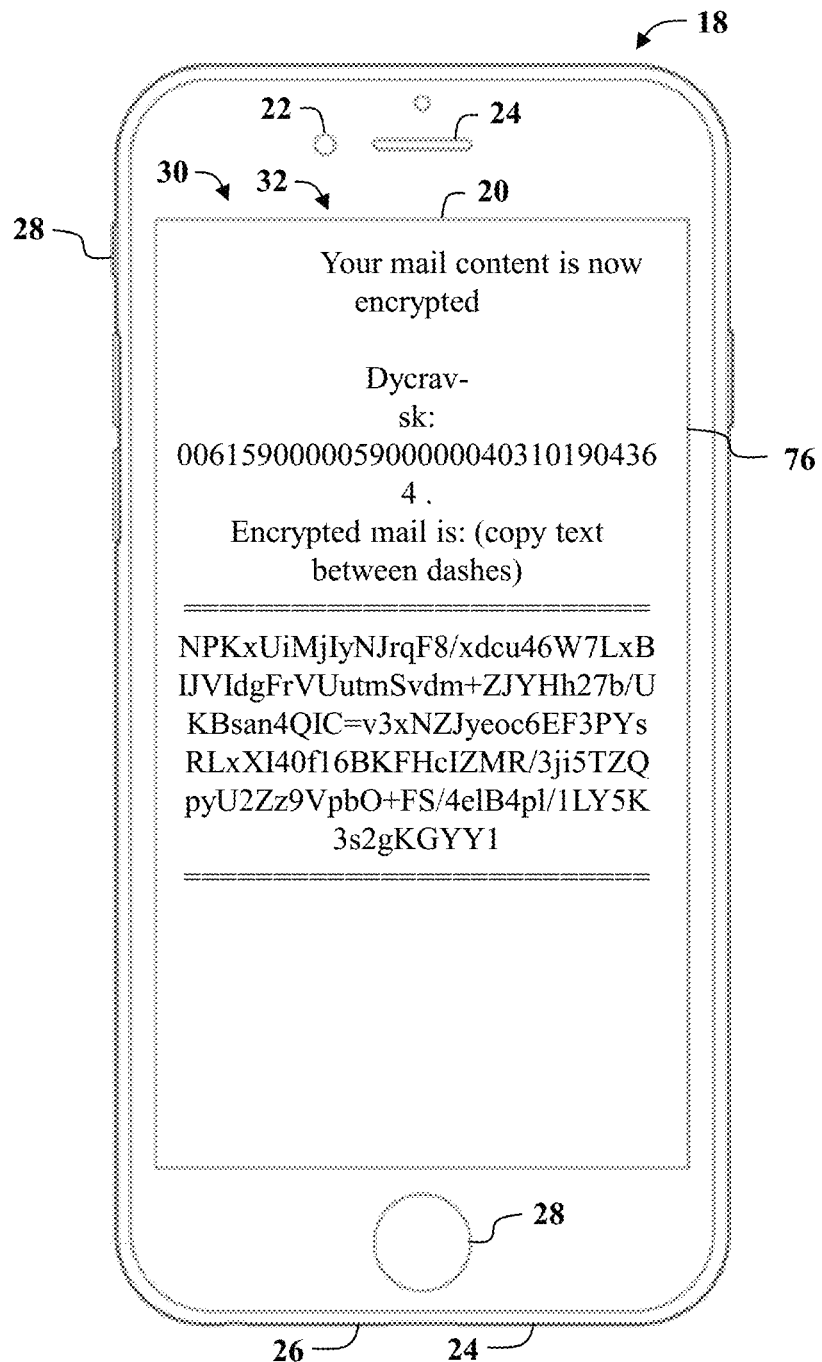
FIG. 2 illustrates a component of the system of FIG. 1.

The application software provides the system 10 with a platform to allow users to send and receive encrypted digital data on any current browser using a cross platform. This improves the accessibility of the application software. For example, the system 10 could have user interfaces implemented in native applications for both iOS and Android in addition to a web-based application. The system 10 may be more efficient for mobile devices, have better access to hardware peripherals, and be available to download via an application store as users of the devices are accustomed to using. The cross platform can be used by one user that uses an iOS interface and another user that uses an Android interface, as shown in FIG. 2. The encrypted digital data may travel in any direction between the different user interfaces. The application software includes a program version that includes a user version available in all the application stores and potentially pre-installed as a part of default carrier software loads (For example: AT&T, Sprint, Verizon, etc.) that will provide the functionality to be described below.

In another embodiment, the application software provides the system 10 with a platform to allow users to send and receive encrypted digital data through a PrivaKey/ChannelKey verification method. The PrivaKeys/ChannelKeys may utilize Blockchain (described in more detail below) and secured by a symmetrical encryption digital certificate (the ReciKey) which can be verified by the system 10. The system 10 may then confirm that the secret key of the secondary symmetrical encryption digital certificate is valid.

In addition, the system 10 provides a way for users to communicate over a network utilizing a mobile device associated with the user to provide notifications to the mobile devices including digital data about incoming digital data. The system 10 determines through the application server the action events and triggering events between the user mobile devices and the application server. The system 10 may then transmit push notifications to the user with information about incoming encrypted digital data. The system 10 may also include a mobile computer application being stored on a mobile device associated with the user. The mobile application uses location and public API's to send notifications to the user. For example, in one embodiment, the user may receive a notification that incoming digital data is ready to be decrypted.

The system 10 is configured to generate and store user data records associated with each user that includes information associated with the user accounts and digital data being sent between the users. In another embodiment, the system 10 may not keep the user data records including digital data sent between the users. The system 10 also determines action events that are associated with the dynamic authentication and the 2-factor authentication in order to send and receive digital data sent between users. The system 10 generates and stores action records that includes information associated with actions to be performed by the system 10 upon detecting activities being performed by the user. For example, the action events may include determining whether the user has entered the correct username and password and whether the user has entered the correct dynamic authentication access code.

In addition, the user data records may include triggering events that are detected by the system 10 to initiate the action events. The triggering events may include, for example, receiving a correct username and password, receiving a correct access code, and receiving a PrivaKey/ChannelKey, ReciKey, and encrypted digital data which triggers a secret key to be entered and decrypted by the system 10.

By generating action records associated with user activities that include triggering events that trigger corresponding system actions, the system 10 improves the speed and functionality of known computing systems by reducing the amount of computing time required to monitor user activity, thus reducing the computing resources required to generate and display relevant digital data from multiple programs to the user.

In addition, the system 10 reduces the computing resources required to manage the data information associated with the sending and receiving of encrypted digital data over known systems by generating data files associated with the user profiles that can be quickly paired based on current user record data to generate electronic decrypted messaging using limited computing resources.

Referring to FIG. 1, one embodiment of a system 10, according to the present invention, includes a server system 12 that is coupled in communication with one or more user computing devices 14 via a communications network 16. The server system 12 may be any suitable server, including an internet transaction server (ITS), an ATG application server or an ATG application instance, a Dynamo server, etc., and may utilize any suitable or combination of technologies configured to enable efficient communication. The communications network 16 may be any suitable connection, including the Internet, Voice Over IP (VoIP), file transfer protocol (FTP), an Intranet, LAN, a virtual private network (VPN), cellular networks, etc., and may utilize any suitable or combination of technologies including, but not limited to, wired and wireless connections, always on connections, connections made periodically, and connections made as needed.

The user computing device 14 may include any suitable device that enables the user to access and communicate with the system 10 including sending and/or receiving information to and from the system 10 and displaying information received from the system 10 to the user. For example, in one embodiment, the user computing device 14 may include, but is not limited to, a desktop computer, a laptop or notebook computer, a tablet computer, a smartphone/tablet computer hybrid, a personal data assistant, a handheld mobile device including a cellular telephone, and the like. The user computing device 14, as well as any other connected computer systems and their components included in the system 10, can create digital data related data and exchange digital data related (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In one embodiment, the user computing device 14 includes a mobile computing device 18 (shown in FIG. 2) for example, a smartphone such as an iPhone™, Android, IOS device, etc. The mobile computing device 18 includes a processor coupled to a memory device, and a database for storing various programs and data for use in operating the mobile computing device 18. The mobile computing device 18 may also include a touchscreen display device 20, one or more video image cameras 22, one or more speakers 24, a microphone 26, at least one input button 28, and one or more sensors including, but not limited to, a touch ID fingerprint sensor coupled to an input button 28, a barometer, a three-axis gyro, an accelerometer, proximity sensor, and an ambient light sensor. In addition, the mobile computing device 18 may also include a Wi-Fi antenna, a cellular network antenna, a Bluetooth™ communications device, assisted GPS and GLONASS, a digital compass, and an iBeacon micro location device.

In the illustrated embodiment of FIG. 2, the mobile computing device 18 includes a web browser programmed and stored in the memory device. The processor executes the web browser program to display web pages on the touchscreen display device 30 that includes information received from the server system 12 to enable the user to interact with and operate the server system 12. In addition, the mobile computing device 18 may be programmed to store and execute a mobile program application, e.g., a mobile application, that displays a user interface 32 on the touchscreen display device 20 that allows the user to access the server system 12 to retrieve and store information within the server system 12 as well as interact with and operate the server system 12. In addition, in one embodiment, the system 10 may install one or more mobile application programs in the memory device of the mobile computing device 18. When initiated by the processor of the mobile computing device 18, the mobile application program causes the processor of the mobile computing device 18 to perform some or all of the functions of the server system 12.

In one embodiment, the information received through the encrypted digital data may include text digital data, files, graphics, videos, streaming audio and/or video, etc., and/or any other digital data that may be sent electronically.

In the illustrated embodiment of FIG. 1, the server system 12 may include one or more servers such as a website hosting server 34, a search engine server 36, an application server 38, a database server 40, and at least one database 42. The database server 40 includes a memory device that is connected to the database 42 to retrieve and store information contained in the database 42. The database 42 contains information on a variety of matters, such as, for example, web pages associated with one or more websites, a plurality of user records, a plurality of user IDs including account data, action events, trigger events, notification digital data, mobile device identifiers, mobile device application program interfaces (APIs), and/or any suitable information that enables the system 10 to function as described herein. In one embodiment, some or all of the information contained in the database 42 may also be stored in the database of the mobile computing device 18.

In the illustrated embodiment, the database 42 includes a user records list 44 (shown in FIG. 5) that includes a plurality of user records 46. Each user record 46 includes a unique user profile 48. Each unique user profile 48 includes a unique user ID 50 and a unique password 52 associated with the unique user ID 50 to authenticate the unique user profile 48. The unique user profile 48 is also associated with an access code 54 for dynamic authentication and at least one PrivaKey/ChannelKey 56. The unique user ID 50 includes user identifying data such as, user contact information e.g., information, a phone number, an e-mail, and/or a mobile device data associated with a mobile computing device 18 associated with the user. For example, the mobile device data may include, but is not limited to, the unique mobile device ID, operating system, phone number, IP address, mobile device API, and/or any suitable information that enables the system 10 to communicate with the corresponding mobile computing device 18. The data associated with the PrivaKey/ChannelKey 56 includes the identifying data such as, for example, a hashed universal unique ID such as a universal telephone system with a unique area code and an individual phone number with a unique extension line and/or e-mail address or an account with a hashed universal unique ID and an unique password.

In one embodiment, the database 42 also includes an action event record list 58 (illustrated in FIG. 6) that includes a plurality of action event records 60. Each action event record 60 may include an action record ID 62, a triggering event 64, action event data 66, and the action event 68. The system 10 may initiate the specific action event ID 62 once the action event 68 is triggered by the triggering event 64. By the action event 68 being triggered by the triggering event 64, the action event 68 may then send the action event data 66 to the corresponding server, dependent on which action event ID 62 has been triggered. The action event data 66 includes information and data including, but is not limited to, determining whether the username and password received are correct, determining whether the access code received is correct, pairing the unique user profile with a PrivaKey/ChannelKey 56, verifying the unique user profile, authenticating the unique user profile, automatically encrypting digital data, sending digital data to a unique user profile, rebuilding the secret key from the ReciKey 90, automatically decrypting the digital data, and display the digital data. As illustrated in FIG. 6, the action event data 66 description may include data associated with the corresponding action record. For example, in one embodiment, the action event data 66, Action006, includes information that enables the system 10 to receive a secret key sent with the digital data. The triggering event data includes data associated with the triggering event 64 that includes an event or occurrence that may be detected by the system 10. The triggering events 64 may include, but are not limited to, requests and/or signals received by the user computing device 14, for example, receiving a correct username and password, receiving a correct access code, preparing a unique user profile to send digital data to be sent, preparing digital data to be sent, sending digital data to a user, receiving digital data from the application server, and verifying the secret key. Once the system 10 initiates the triggering event 64, the triggering event 64 triggers the corresponding action event ID 62, which will send the action event data 66 to the corresponding server and/or user.

Figure 9:
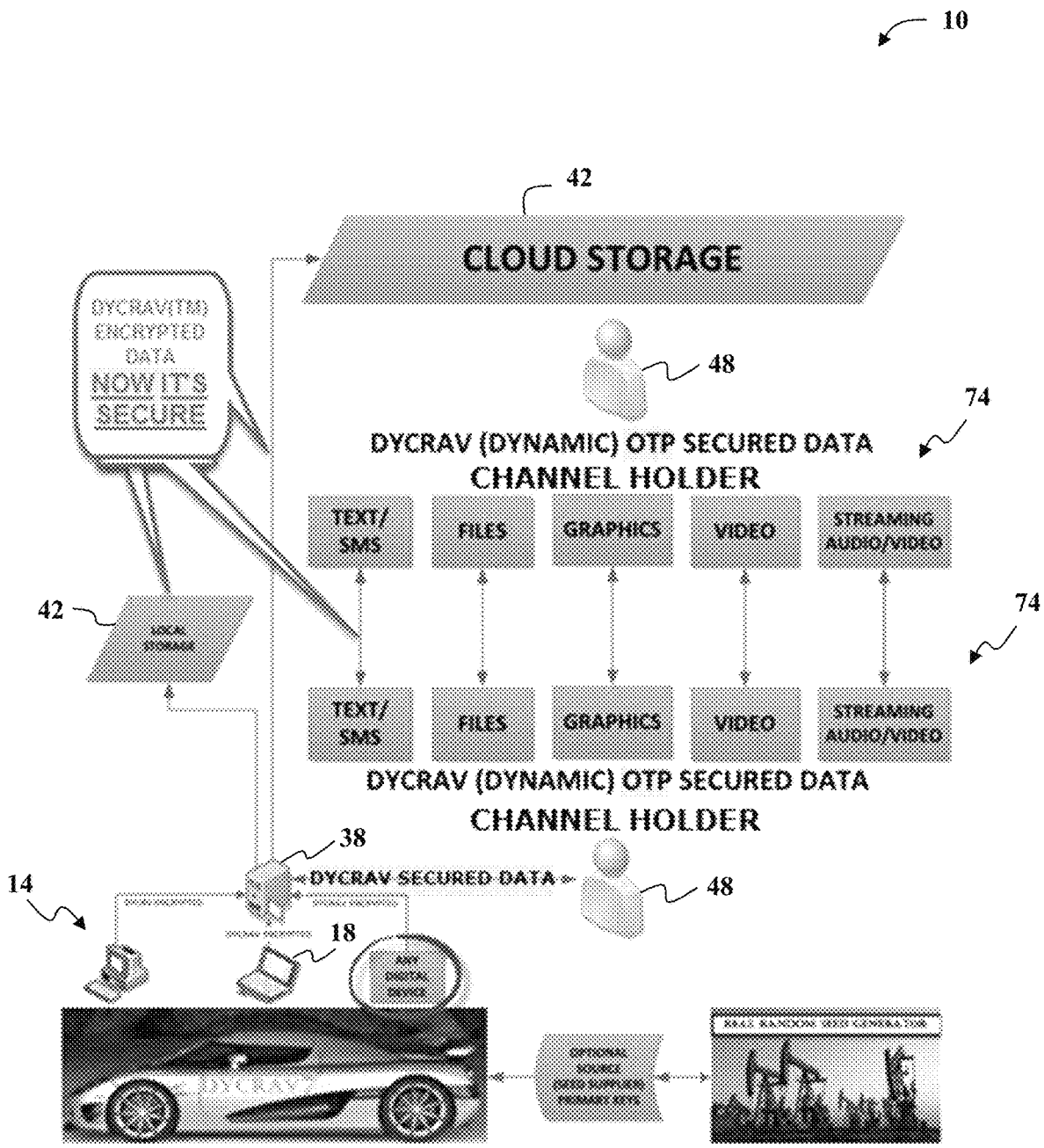
FIGS. 9-16 are illustrations of various embodiments of the present invention that may be used with the system of FIG. 1.

The database 42 may also include a user action record list 70 (shown in FIG. 7) that includes a plurality of user action records 72 that are associated with a plurality of users. Each user action record 72 includes the user record 46 associated with the corresponding unique user ID 50, the action record ID 62, the triggering event 64, and action event data 66. In addition, the user action record 72 may also include messaging and/or digital data information 74, including data and information to be sent with a mobile computing device 18 associated with the corresponding unique user profile 48 and/or API information associated with the corresponding mobile computing device 18. In one embodiment, the messaging digital data information 74 may also include contact information such as, for example, emails, and/or text and phone numbers. The application server 38 may identify one or more additional users that may receive notifications generated by the website hosting server 34 and include contact information associated with the identified additional users in the messaging digital data information 74 that has sent or received digital data using the system 10. For example, the user action record 72, with User ID "Username1", may include the process that corresponds with Action001 (shown in FIG. 9), where the triggering event 64 is when the application server 38 receives a username and password, which triggers the action event data 66 in order to determine whether the username and password and user dynamic authentication received are correct.

The website hosting server 34 is configured to host a website that is accessible by the user via one or more user computing devices 14. The website hosting server 34 retrieves and stores webpages 76 associated with one or more websites in response to requests received by the user via the user computing device 14 to allow users to interact with the website and send and receive encrypted digital data.

In the illustrated embodiment, the search engine server 36 is configured to receive a search request from the website hosting server 34 and/or the application server 38 including one or more search terms, and generate search data including a plurality of user records as a function of the search terms. For example, in one embodiment, the search engine server 36 may initiate a search program based on a Boolean model to search user records 72 and/or search terms that contain a specific PrivaKey/ChannelKey 56 and/or a unique user ID 50 in the database 42 based on search terms received from the user profile through the website hosting server 34 and/or received from the application server 38. For example, the user may not know the PrivaKey/ChannelKey 56 or username of the user they are trying to send encrypted digital data to and may search the database 42 for a specific user PrivaKey/ChannelKey 56 or unique user ID 50.

In the illustrated embodiment, the application server 38 is programmed to monitor activities associated with the plurality of user records 72 and process the encrypted digital data being sent and received. The application server 38 authenticates the first user profile and the second user profile. The application server 38 is further programmed to receive a PrivaKey/ChannelKey 56 associated with the first user profile and the second user profile. The first user profile and the second user profile are further authenticated via the PrivaKey/ChannelKey 56 separate from the authentication of the user profiles. The application server 38 then automatically encrypts a plurality of digital data sent from the first user profile to the second user profile. The plurality of encrypted digital data includes the PrivaKey/ChannelKey 56 and a Recikey 90 where the ReciKey 90 includes a secret key 92. The application server 38 then sends the plurality of encrypted digital data to the second user profile from the first user profile using the secret key 92. The application server 38 then rebuilds the secret key 92 from the ReciKey 90 to prepare the plurality of digital data. Upon rebuilding the secret key 92, the application server 38 automatically decrypts the plurality of encrypted digital data and displays the plurality of digital data for the second user profile.

In another embodiment, the application server 38 is programmed to monitor activities associated with the plurality of user records 72 and process and/or pass through the encrypted digital data being sent and received. The application server 38 authenticates the first user profile and the second user profile. Once the application server 38 receives encrypted digital data from the unique user profile 48, the application server 38 may be configured to authenticate the first user profile using the paired access code 54 with the unique user ID 50 of the unique user profile 48. The application server 38 is further configured to send encrypted digital data to a second user profile from the first user profile. The encrypted digital data includes a PrivaKey/ChannelKey 56 and a ReciKey 90, where the PrivaKey/ChannelKey 56 is associated with the second user profile and the ReciKey 90 includes a secret key 92. The PrivaKey/ChannelKey 56 will also be associated with the first user profile. The application server 38 may then receive the encrypted digital data from the first user profile to be sent to a second user profile. The second user profile will be authenticated by the username and password and also be dynamically authenticated using a different access code than the access code used for the first user profile. The application server 38 is configured to then build the secret key 92 to prepare the encrypted digital data to be decrypted. In another embodiment, the program is configured to then build the secret key 92 to prepare the encrypted digital data to be decrypted. Once the secret key 92 is built and verified, the encrypted digital data may be decrypted and displayed to the second user profile.

In another embodiment, the application server 38 is programmed to detect the occurrence of triggering events 64 associated with the plurality of user records and the digital data being sent and received. The application server 38 may also be programmed to receive updates to user profiles for use in determining whether the unique user profile 48 has modified the username, password, and/or access code.

In the illustrated embodiment, the application server 38 is programmed to access the database 42 including a plurality of user records 72. In addition, the application server 38 is configured to verify a first user profile and a second user profile. The first user profile includes a first user ID and a first password to authenticate the first user profile and the second user profile includes a second user ID and a second password to authenticate the second user profile. The application server 38 is then configured to pass through the dynamically authenticated first user profile and the second user profile 48. The application server 38 uses a unique access code 54 to dynamically authenticate the user profile. The application server 38 is configured to then pass through the encrypted digital data to the second user profile from the first user profile. The encrypted digital data includes a PrivaKey/ChannelKey 56 and a ReciKey 90. The PrivaKey/ChannelKey 56 is associated with the second user profile. The PrivaKey/ChannelKey 56 may utilize Blockchain smart contracts. Each authenticated user's program is further configured to use a random number generator to create and recreate the secret key 92 where the secret key 92 is a one-time-use (OTU) based key. The application server 38 is configured to receive a random number generated secret key 92. The application server 38 then passes through the encrypted digital data from the first user profile. Each authenticated user's program is configured to create and recreate the secret key 92 to prepare the encrypted digital data to be decrypted. Each authenticated user's program is configured to automatically decrypt the encrypted digital data and display the decrypted digital data on a user computing device 14.

In another embodiment, the system 10 may be implemented on any user interface 32 that includes a unique user ID 50 and a unique password 52. For example, iOS device, tablet, laptop, computer, Android device, and/or any user interface 32 that requires a username and password to log-in. In one embodiment, the system 10 may send encrypted digital data from a first user profile that utilizes a first user interface and receive the encrypted digital data on a second user profile that utilizes a second user interface that is different than the first user interface. It should be appreciated that this allows the system 10 to be used in many different industries, including but not limited to, the banking industry, including off-shore banking, smart gaming devices, smart gambling devices, et al.

In one embodiment, the first user profile and the second user profile must be logged into the system 10 at the same time to send and receive the encrypted digital data.

In the illustrated embodiment, as shown in FIG. 7, the application server 38 is programmed to receive a username and password from a user and determine whether the username and password received are correct. Then once the application server 38 receives a correct username and password the application server 38 may ask for an access code 54 from the user and verify that the access code 54 received is correct. The application server 38 may then receive a correct access code 54 and pair the PrivaKey/ChannelKey 56 with the correct user profile. For example, in FIG. 7, Username1 entered a correct username and password and a correct access code 54 to the application server 38 and before the encrypted digital data is sent through the application server 38, the system 10 may pair the user profile with the associated PrivaKey/ChannelKey 56.

In another embodiment, illustrated in FIG. 7, the application server 38 is configured to prepare digital data to be sent to a compatible user computing device 14, such as B2B, M2M, AI-to-AI, peer-to-peer, et al. The application server 38 may combine the PrivaKey/ChannelKey 56, the ReciKey 90, and the encrypted digital data in order to be sent to the compatible user computing device 14. Then the application server 38 may send the digital data. Once the application server 38 sends the digital data, the receiving application server 38 may receive a secret key 92 that is sent with the encrypted digital data. The receiving application server 38 may then rebuild the secret key 92 to decrypt the encrypted digital data. Upon rebuilding the secret key 92, the receiving application server 38 automatically decrypts the plurality of encrypted digital data and displays the plurality of decrypted digital data for the user profile.

In another embodiment, the application server 38 is configured to receive information from the website hosting server 34 and the search engine server 36, and send the information to the database server 40 to be stored in the database 42. In addition, the application server 38 is configured to receive action events 68 from the website hosting server 34 and the search engine server 36 and in response is configured to send triggering events 64 back to the plurality of servers. The application server 38 is configured to monitor the action events 68 and the triggering events 64 between all of the servers in the system 10. In another embodiment, the database server 40 receives all of the information collected by the application server 38 and stores the information in the database 42. This information includes encrypted digital data sent and received and user profiles.

In addition, the application server 38 is configured to connect with the plurality of servers using secret authentication mechanisms, application keys, call different methods on the plurality of servers, APIs, and reformat the results of the data back for use by the application server 38 so that the application server 38 can send the data to the website hosting server 34 to be displayed on the user computing device 14. The application server 38 is configured to be a bridge between the products and/or services completely separate from the website hosting server 34.

In another embodiment, to accommodate secure digital data exchange over the system 10, "all" parties to the exchange process must: 1) have purchased a methodology or program to access the basic APP itself, and be legally signed into the APP portion residing on the application server 38; 2) have the "identical PrivaKey/ChannelKey 56," selected on each individual digital device or user computing device 14; and, 3) individually, and separately, undergo two (2) separate, uniquely different multi-factor authentication/verification actions (i.e., processes) in order to proceed with the desired secure communication process.

The method initially includes, for anyone and/or everyone participating in each and every contemplated secure exchange of digital data session to accomplish individually, separately, uniquely different, and independently, the steps of accessing their own separate application with a "dynamic" (ever-changing) authentication/authorization methodology. In the method (while always residing solely and independently on "each" users' computing device(s) 14), an authentication process is initiated independently by both/all users, wherein the first user profile includes a unique, "dynamic" (and entirely changeable at any time after an initial authentication/authorization) password-alternative process to authenticate the first user profile; and, the second user profile (while always residing only on the second user computing device 14) includes a second user unique, "dynamic" (and entirely changeable at any time after an initial authentication/authorization) password-alternative process to authenticate the second user profile.

Once properly and "dynamically" authenticated locally, each user then proceeds to access the application server 38, and thereupon be independently authenticated/authorized access to the system 10 a second time.

The method includes the steps of accessing a Smart Contract database (DB) including a plurality of individual user records 46 stored securely on the application server 38. The database 42 consists of a Blockchain based distributed computing platform and operating system featuring Smart Contract (scripting) functionality (i.e., smart contracts that are not originally intended to be cryptocurrency oriented, but are so capable and adaptable, if desired). The system 10 is a permission-based "private Blockchain" with private storage facilities used for Smart Contract applications, such as, the automated: a) sale; b) management; c) authentication, authenticity, and validity; and, d) secure storage of/access to the database 42 of a plurality of the stored, non-compromised/-duplicated, legitimate present invention "PrivaKey/ChannelKey specific" identification features. It should be appreciated that, no PrivaKey/ChannelKey 56 is ever stored in or on the application server 38, nor in the Smart Contract (DB). It should also be appreciated that it is the individual's responsibility to keep private and store securely their own individually purchased PrivaKey/ChannelKey(s) 56 at all times, and failure to do so will drastically compromise PrivaKey/ChannelKey 56 security.

Blockchain (first invented by the cryptographers Stuart Haber and Scott Stronetta in 1991) as used in the present invention, constitute a cryptographically sealed, immutable record of electronic digital records (wherein any type of information can be added to a Blockchain) and stored on a distributed ledger in the form of a chronological chain of cryptographically hashed electronic digital data. This cryptographically hashed data is stored securely in duplicate private databases 42 in several secure dispersed locations, so as to preserve the integrity of the Blockchain, plus in addition, also attempt to prevent a single point of attack (SPA) by any hacker(s).

In another embodiment, the symmetrical encryption-based (SE) Blockchain smart contract in the present invention is constructed so as to prove the authenticity of electronic digital financial, et al., documents, transactions, and files to determine if the document(s), et al., has/have been altered (in any fashion), thus solving three (3) unique problems: a) the electronic digital data itself has to be time-stamped and/or SE digitally signed so that it is impossible to change even one bit of the electronic digital data without the change being readily apparent; b) then run the electronic digital data through a cryptographic hashing function, which produces a unique PrivaKey/ChannelKey-based ID for the electronic digital data; and, c) it then becomes impossible to change the time-stamp itself.

The time-stamped (unique PrivaKey/ChannelKey-based ID) symmetrical encryption-based (SE) Blockchain (i.e., Smart Contract) as used in the present invention insures that the present invention's: a) secure electronic digital data is cryptographically certified; b) authenticity; c) security; d) integrity; d) structure; e) originality; plus, and most critically, f) original ownership of each PrivaKey/ChannelKey 56 (which must be pre-purchased, stored locally, and used during each and every transaction by the present invention's user(s)) in order to work. (It should be appreciated that, the PrivaKey/ChannelKey 56, the key feature of the application, is sold commercially to individual users of the IT, and without a legally purchased/subsequently verified (by a possible subscription-based model) PrivaKey/ChannelKey 56, the IT will not work).

The method using the application server 38, includes the initial steps of independently verifying a first user profile and any subsequent, i.e., a second, et al., user profile which resides in the Smart Contract database 42 including a plurality of user records 46. The user records 46 include a plurality of cryptographically hashed user profiles 48. Each of the user profiles 48 includes a unique user ID 50 (associated with a valid e-mail address, or other ID methodology, if desirable) and a unique, user chosen password 52 associated with the unique user ID 50 to authenticate each individual user profile.

The application server 38 is further programmed after first authenticating the first user profile and the second/all user(s) profile(s) to send via SLS/TLS, VPN, et al., bi-directionally (i.e., to pass "securely" unimpeded), any subsequently encrypted digital data (i.e., "Cipher text," et al.) to the second user profile from the first user profile (and vice versa).

The method further includes a process for a Secure Digital Data Exchange (SDDE) system thereby allowing each individual user to automatically (and independently) encrypt and/or automatically decrypt any type of digital data on their own separate Digital Device(s)/Browser(s)/Operating System(s) using One Time Use (OTU) SE secret keys 92. The method initially includes the steps of accessing a user database 42 including a plurality of individual user PrivaKeys/ChannelKeys 56 which are stored independently, and only, on each individual user's Digital Device(s).

In the method, the freely "transiting" encrypted digital data includes a selected "Channel ID and unique Channel Salt", wherein the selected PrivaKey/ChannelKey 56 is associated with the first user profile (which also must be selected independently/separately by the second/all user(s) to function properly).

Wherein the OTU SE secret key 92 plus its associated ReciKey 90, a monoid of hash values using an unspecified cryptographic operation combining the PrivaKey/ChannelKey ID, unique PrivaKey/ChannelKey Salt, and a PrivaKey/ChannelKey Secret to create an obfuscated/hidden within OTU SE secret key 92 is generated.

The application server 38, or alternately a P2P, B2B, M2M, et al., type methodology passes securely through the encrypted digital data from the first user profile (and bi-directionally vice versa), "unchanged, and untouched" to the second user profile(s).

The method further includes the steps of automatically rebuilding the OTU SE secret key 92 from the ReciKey 90 therein to prepare the encrypted digital data to be automatically decrypted. This allows the encrypted digital data to automatically be decrypted, and automatically renders the once formally SE encrypted digital data back into its "plain-text/clear text" (i.e., readable) format on the second/all user's profile(s) (and bi-directionally vice versa). The digital data can then be stored (encrypted or unencrypted, as desired) on any available digital device, retransmitted encrypted, or "securely" deleted in its encrypted or unencrypted format.

In yet another embodiment, the present invention provides a multi-faceted identification, authentication, authorization, access, and accommodation "secure" digital data exchange and storage methodology and program. The methodology and program is a web application transiting bi-directionally over the application server 38 using any type of browser; any type of digital device; encompassing any type of digital data (i.e., text, SMS, files (of any type, including folders, graphics and streaming audio and/or video). In addition, the present invention may stream audio and/or video, and transit the secure digital data over any type of P2P, B2B, M2M, IOT, et al., network methodology.

To accommodate secure digital data exchange over the system 10, all users to the exchange process must have legally obtained and/or purchased and have access to the basic application server 38. In addition, all users must be signed into the application server 38 on both the individual user's digital computing device 14 and the system 10. Each user must have the identical PrivaKey/ChannelKey 56 selected on each individual digital computing device 14 and each user must individually and separately, undergo two (2) uniquely different multi-factor authentication/verification actions (i.e., processes) in order to proceed with the desired/selected "secure" communication process.

In another embodiment, the method may include the step of individually, and independently, accessing two (2) separate and unique databases 42, 43. The first database 43 includes a plurality of individual user PrivaKeys/ChannelKeys 56 which are purchased individually by each user. The individual user PrivaKeys/ChannelKeys 56 are stored separately and independently on each individual user's computing device 14. The method further includes the step of verifying the first user profile and the second user profile. This verification process includes the steps of independently, separately and dynamically, authenticating both the first user profile and the second user profile. Once the user profiles 48 have been dynamically authenticated, a second accessing protocol must be initiated with the application server 38. The user profiles 48 are separately authenticated using the application server 38 (i.e., Smart Contract). The application server 38 must be accessed successfully via the user profiles 48 on the user computing devices 14 before any secure data exchange(s) can occur over the application server 38.

The system 10 further includes the steps of automatically encrypting and sending any type of digital data 74 (i.e., "cipher text," et al.) to the second user profile from the first user profile (and bi-directionally vice versa). The automatically encrypted digital data includes a PrivaKey/ChannelKey 56 identifier and a ReciKey 90, wherein the PrivaKey/ChannelKey 56 is associated with the second user profile, and wherein the ReciKey 90 includes an obfuscated/hidden within one-time-use (OTU) symmetrical encryption (SE) secret key 92. The second user automatically receives the encrypted digital data from the first user profile (and bi-directionally vice versa). The method further includes the steps of automatically rebuilding/recreating the OTU SE secret key 92 from the ReciKey 90 to prepare the encrypted digital data to be automatically decrypted. Once the encrypted digital data is decrypted, the system 10 then automatically displays the once formally encrypted digital data back into its plaintext/clear text (i.e., readable) format on the second user's profile (and bi-directionally vice versa). This data can subsequently be: stored (encrypted or unencrypted) on any device, retransmitted encrypted, or securely deleted in its encrypted or unencrypted format.

Figure 3:
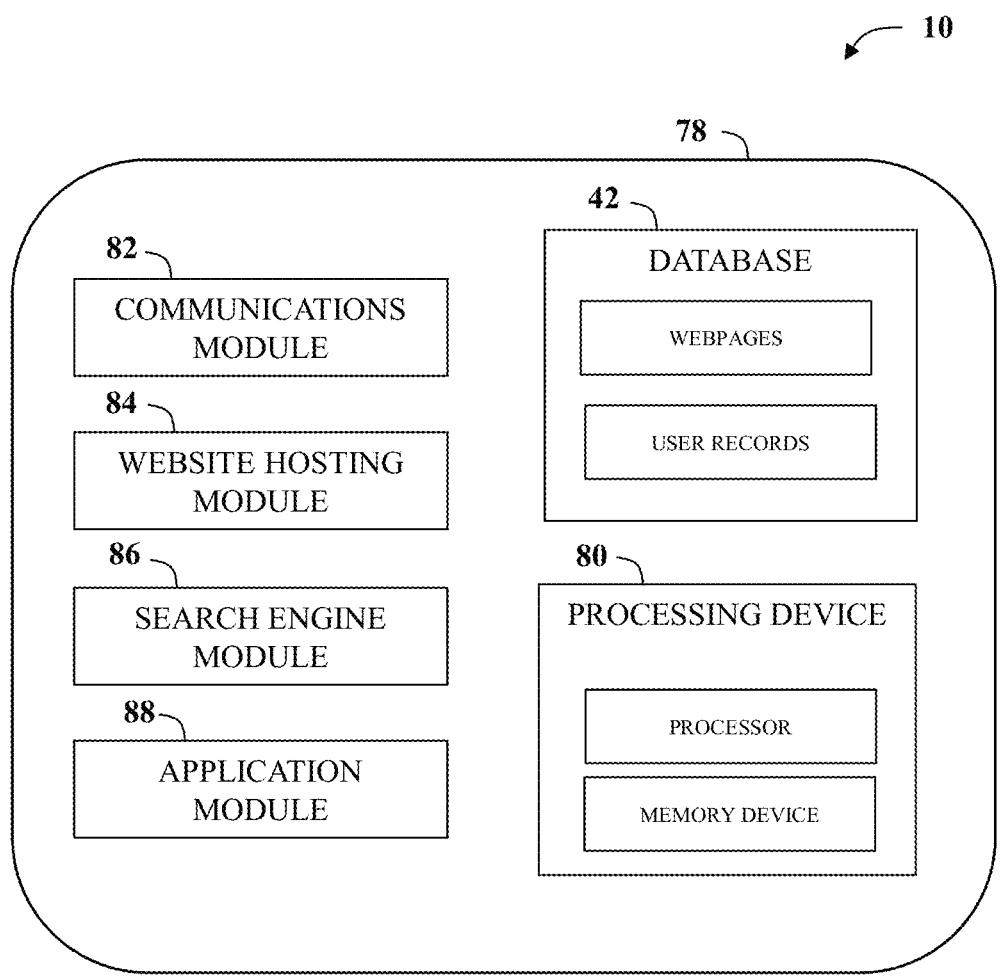
FIG. 3 is a schematic illustrating example components of a server computer that may be used with the system illustrated in FIG. 1.

Referring to FIG. 3, in one embodiment, the system 10 may include a system server 78 that is configured to perform the functions of the website hosting server 34 (access server), the search engine server 36, the application server 38, and the database server 40. In the illustrated embodiment, the system server 78 includes a processing device 80 and the database 42.

The processing device 80 executes various programs, and thereby controls components of the system server 78 according to user instructions received from the user computing device 14. The processing device 80 may include memory, e.g., read only memory (ROM) and random access memory (RAM), storing processor-executable instructions and one or more processors that execute the processor-executable instructions. In embodiments where the processing device 80 includes two or more processors, the processors can operate in a parallel or distributed manner. In an example, the processing device 80 may execute a communications module 82, a website hosting module 84, a search engine module 86, and an application module 88.

The processing device 80 may also include a memory device for storing programs and information in the database 42, and retrieving information from the database 42 that is used by the processor to perform various functions described herein. The memory device may include, but is not limited to, a hard disc drive, an optical disc drive, and/or a flash memory drive. Further, the memory device may be distributed and located at multiple locations.

The communications module 82 retrieves various data and information from the database 42 and sends information to the user computing device 14 via the communications network 16 to enable the user to access and interact with the system 10. In one embodiment, the communications module 82 displays various images on a graphical interface of the user computing device 14 preferably by using computer graphics and image data stored in the database 42 including, but not limited to, user records, encrypted digital data, decrypted digital data, and/or any suitable information and/or images that enable the system 10 to function as described herein.

The website hosting module 84 may be programmed to perform some or all of the functions of the website hosting server 34 including hosting various web pages associated with one or more websites that are stored in the database 42 and that are accessible to the user via the user computing device 14. The website hosting module 84 may be programmed to generate and display webpages associated with a website in response to requests being received from users via corresponding web browsers.

The search engine module 86 may be programmed to perform some or all of the functions of the search engine server 36 including generating and storing search data in response to the user search request and/or application module 88 search requests.

The application module 88 may be programmed to perform some or all of the functions of the application server 38 including sending and receiving digital data amongst the users, processing the digital data, detecting trigger events from actions, and/or generating the digital data between all of the modules.

Figure 4:
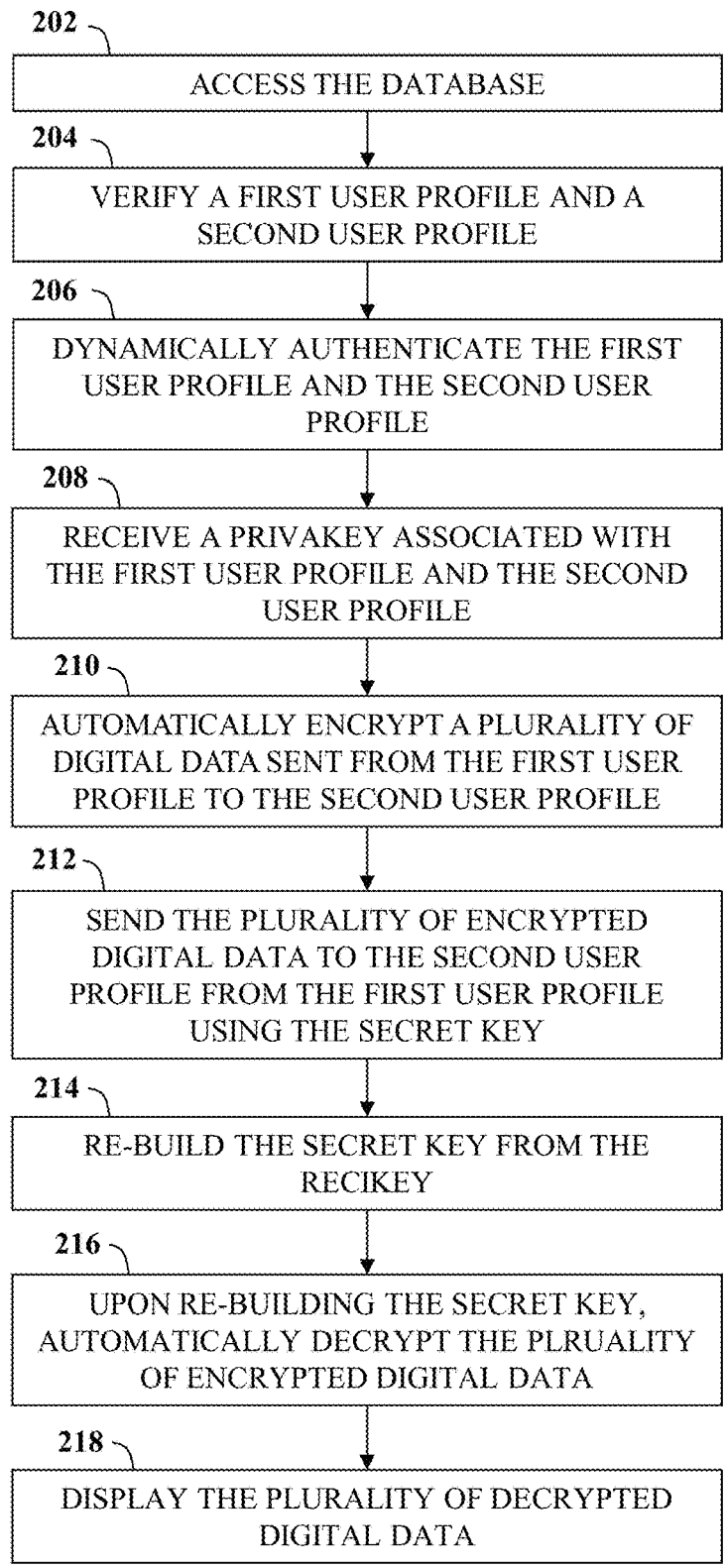
FIG. 4 is a flowchart of a method, according to the present invention, that may be used with the system shown in FIG. 1.

Referring to FIG. 4, a flowchart of one embodiment of a method 200, according to the present invention, that may be used with the system 10 for providing encrypted and decrypted digital data between users. The method 200 includes a plurality of steps. Each method step may be performed independently of, or in combination with, other method steps. Portions of the method may be performed by any one of, or any combination of, the components of the system 10.

In method step 202, the application server 38 accesses the database 42 that includes a plurality of user records 46. Each user record includes a user profile and each user profile includes a unique user ID 50 and a unique password 52 associated with the unique user ID 50. Each user profile is associated with at least one unique PrivaKey/ChannelKey 56.

In method step 204, the application server 38 is configured to verify a first user profile and a second user profile. The first user profile includes a first user ID and a first password to verify and/or authenticate the first user profile. The second user profile includes a second user ID and a second password to verify and/or authenticate the second user profile. The first user profile and the second user profile may be verified by the application server 38 at the same time or at different times.

In method step 206, the application server 206 is configured to dynamically authenticate the first user profile and the second user profile. The application server 38 dynamically authenticates the user profile using an unique access code 54. The unique access code 54 for the first user profile may be the same or different than the access code for the second user profile. The first user profile and the second user profile may be dynamically authenticated by the application server 38 at the same time or at different times. The first user profile and the second user profile may send and receive encrypted digital data once both user profiles have been verified and dynamically authenticated. Both user profiles must be logged into the system 10 or only one user profile can be logged into the system 10 in order to send and receive encrypted digital data.

In method step 208, the application server 38 is configured to receive a PrivaKey/ChannelKey 56 associated with the first user profile and the second user profile. The first user profile and the second user profile are further authenticated via the PrivaKey/ChannelKey 56.

In method step 210, the application server 38 is configured to automatically encrypt a plurality of digital data sent from the first user profile to the second user profile. The plurality of encrypted digital data includes the PrivaKey/ChannelKey 56 and a ReciKey 90. The ReciKey 90 includes a secret key 92.

In method step 212, the application server 38 is configured to send the plurality of encrypted digital data to the second user profile from the first user profile using the secret key 92. The encrypted digital data includes a PrivaKey/ChannelKey 56 and a ReciKey 90. The secret key 92 is a one-time-use (OTU) based key.

Further, in method step 214, the application server 38 is configured to rebuild the secret key 92 from the ReciKey 90 to prepare the plurality of digital data. In method step 216, the application server 38 is configured to automatically decrypt the plurality of encrypted digital data upon the rebuilding of the secret key 92. In method step 218, the program is configured to display the plurality of decrypted digital data for the second user profile.

In one embodiment, the system 10 is configured to be implemented on a user interface 32 that includes a unique user ID 50 and a unique password 52. The system 10 may be used on any system that allows a user to log-in using username and password, for example, the banking industry, off-shore banking, ATM, Facebook™, messaging, etc., and/or any other system where a user may log-in using a unique username and password.

In another embodiment, the first user profile utilizes a first user interface and the second user profile utilizes a second user interface that is different than the first user interface. For example, the first user profile may be implemented on an IOS device and the second user profile may be implemented on an Android device, iPhone™ device, et al.

In one embodiment, the system 10 may not be an encryption algorithm. The system 10 may be implemented and mated to any symmetrical algorithm by creating and recreating then storing and/or transmitting OTU or "throwaway" secret keys 92, which can be used in conjunction with any symmetrical algorithm.

In various embodiments, the system 10 includes unique and distinct different types of keys including, but not limited to, an individual OTU PrivaKey/ChannelKey 56, an OTU throwaway secret key 92 (symmetrical encryption), and an OTU ReciKey 90. Each user must have one or more individual OUT PrivaKey/ChannelKey 56, if desired, and/or necessary. The OTU throwaway secret key 92 is also known as a SecretKey 92 that is generated from the PrivaKey/ChannelKey 56 for each and every transaction. The OTU ReciKey 90 is sent along with the secured or encrypted data for re-creation of the individual OTU throwaway Secret Key 92 being used in each transaction.

In another embodiment, the system 10 utilizes the OTU PrivaKey/ChannelKey 56 which is never repeated or ever replicated. This indicates that the individual user is ultimately responsible for the use and security, exactly like the PKI user's counterpart, the Private Key. The user is unaware of the one-time-use (OTU) secret key 92 (i.e., Secret Key) being used in any operation because every transaction is automated and dynamic. Each secure digital data transaction is conducted with the secret key 92 recreation capability, and the ReciKey 90 is stored in the secure digital data itself. This means that the user may not use any other method of secret key exchange while using the system 10 because the system may be a completely automated process.

For example, if an employee leaves a company there is not a need for key revocation. The company may use another PrivaKey/ChannelKey 56, plug it in, and keep on going. This process is discontinuing the use of the outdated PrivaKey/ChannelKey 56 and re-encrypting the data with the new PrivaKey/ChannelKey 56, or the system 10 may move the secure data to another secure location inaccessible to the forbidden PrivaKey/ChannelKey 56. The system 10 may not need to determine the location of a public key or if it is secure. Only users that are issued PrivaKey/ChannelKeys 56 have access to their own PrivaKey/ChannelKey 56 data.

In one embodiment, the system 10 may incorporate or work with PKI should the need arise, making the system 10 a hybrid derivation.

In various embodiments, the system 10 uses both a normal and dynamic authentication procedure. The dynamic authentication (i.e., challenge-response) may utilize any choice of method and when implemented in any system, the dynamic authentication may provide a strong 2-/3-factor authentication process.

In another embodiment, the dynamic authentication method (also known as the access code 54) may be strengthened by individual users by lengthening the number of characters (i.e., from the 4-character default) which should be selected during the initial authentication/sign-in process. The user may change the authentication number of characters at any time, for example, the user may change the access code 54 to a length of 32 characters for instance, if desired, allowing the user to not be restricted to the usual 4-character authentication process. This dynamic authentication method establishes the true identity of the person seeking access to the system 10. In addition, the dynamic authentication method including the unique access code 54 may include a dynamic duress capability where a user may enter an alternate authentication duress code (DuraCode™) which may initiate certain secret internal and external safety procedures. There is no character restriction to the duress authentication. The ReciKey 90 is coupled with the dynamic authorization/access procedures that allows for built-in non-repudiation and forensics capability.

In another embodiment, the system 10 utilizes Blockchain in each authentication, verification, sale, transaction, and/or accounting, et al. Blockchain is a distributed ledger system that maintains a continuously growing record of transaction, or blocks, where each block is linked to a previous block and cannot be altered or reversed once it is added to the chain. Blockchain solves the issue of trust within a transaction without requiring a central administrator to guarantee the veracity of any block. Blockchain may move, store, and track anything of value (i.e., title, contracts, music, film, etc.) all securely and at low cost. Blockchain can create efficient payment, verification, and IP tracking systems. For example, self-executing smart contracts can divide any pay out percentage profits between multiple contributors as soon as the payment is received. Blockchain may enable content creators to release their work directly to consumers without the need for an extensive distribution system or adding a layer to a complicated web of contracts and accounting. Since every transaction is apparent, the Blockchain rules can be embedded for how the content is used.

In one embodiment, the system 10 may be an active only application where both users must be online at the same time in order to communicate securely. The system 10 may also be option only where a user may leave secured digital data, files, graphics, videos, etc., on the PrivaKey/ChannelKey 56 based system of the receiving user for later retrieval. The system 10 may also include a modified 2-factor security access for the users. The system 10 utilizes a secure line of communication to access the hosting URL by a (changeable) username and password being entered by each user and each user signing in to their individual program dynamically. Each individual dynamic access code is known only by each individual user, and may be changed by the user at any time. The duress capability may erase the PrivaKey/ChannelKey 56 once activated.

In another embodiment, each user of the system 10 may have a fully working system consisting of three inter-related parts including the dynamic access having been successfully accomplished at each end of the communication, the application itself or the engine, and the PrivaKey/ChannelKey 56 to be used in the communication. If any part of the system 10 is missing, the system 10 will be unusable.

In another embodiment, the system 10 may choose to not store the digital data exchanged on their digital data storage device, thereby leaving no evidence of any activity having been accomplished during any given session, except when either party physically chooses to save a particular element (i.e., a cypher text (encrypted) and/or clear text (unencrypted)) received on their individual digital data storage device(s).

In one embodiment, e-mail verification of the user may be accomplished in order to facilitate the transfer of any/all purchased PrivaKeys/ChannelKeys 56. This is required in order to insure that each legally dispensed PrivaKey/ChannelKey 56 is valid and authenticated by the legal issuing authority. This process may be done with any valid digital certificates authenticating each purchased PrivaKey/ChannelKey 56.

In various embodiments, the transfer of a PrivaKey(s)/ChannelKey(s) 56 to a specific user includes, but are not limited to, a plurality of steps. The initial sign-up of the system 10 includes assigning OTU PrivaKeys/ChannelKeys 56 to a user and installing the system 10 on the user computing device 14 of choice (i.e., UFD, smart phone, tablet, notebook, laptop, etc.). If the system 10 is pre-installed on the user's computing device 14 then the PrivaKeys/ChannelKeys 56 may be transmitted via a ReciKey 90 to re-create the PrivaKeys/ChannelKeys 56 on the user's computing device 14. If the application is not pre-installed on the user computing device 14 then the PrivaKeys/ChannelKeys 56 may have to be transmitted/exchanged via some pre-arranged secure method, i.e. the Internet, et al. For example, the data may be transmitted via a secure server, such as a secure SSL/TLS or other similar method. In addition, the data may be transmitted via zipping or password protecting, using a VPN established between the system 10 and the user, using a snail mail system (i.e., USPO, UPS, FedEx, etc.), by hand carrying the data to the user, using a system similar to the 3d bar code containing the secret key 92, or using a PKI method.

In another embodiment, any browser may be used to transfer securely any digital/analog data in any format. Any digital device with any O/S may be used to transfer securely/clandestinely any digital/analog data over any browser. The system 10 may be a program agnostic. The system 10 may be a variable process of key selection methods (multiple numbers and varieties exist). The system 10 may be a dynamic, ever-changing, non-repeating, with multiple variables, automatic and completely unknown to anyone while securing digital data in any format with unlimited key length OTU secret keys 92 plus being able to be stored securely and indefinitely anywhere, anytime.

In one embodiment, the system 10 may use the exportable AES 256-bit program or algorithm. The system 10 may be an automated OTU (throwaway) secret key 92 generator/re-creator without anyone ever knowing what the generated secret key 92 being used is within the system 10. The current PrivaKeys/ChannelKeys 56 may replace the PrivaKey/ChannelKey 56 designation. In another embodiment, the dynamic authentication/duress capability is added to the system 10.

In one embodiment, the system 10 may be sustainable encryption through ongoing exchange of OTU secret keys 92, without the users knowing what the secret keys being used are, between each user. Every transaction, between each party with an identical, individually tailored OTU PrivaKeys/ChannelKeys 56 installed, is a one-time process resulting in delivering increased speed, reliability, efficiency and a more secure solution.

In various embodiments, the system 10 is further illustrated in FIGS. 8-16. In one embodiment, the system 10 may allow any user device to be separate and standalone to begin using the system 10.

Figure 8:
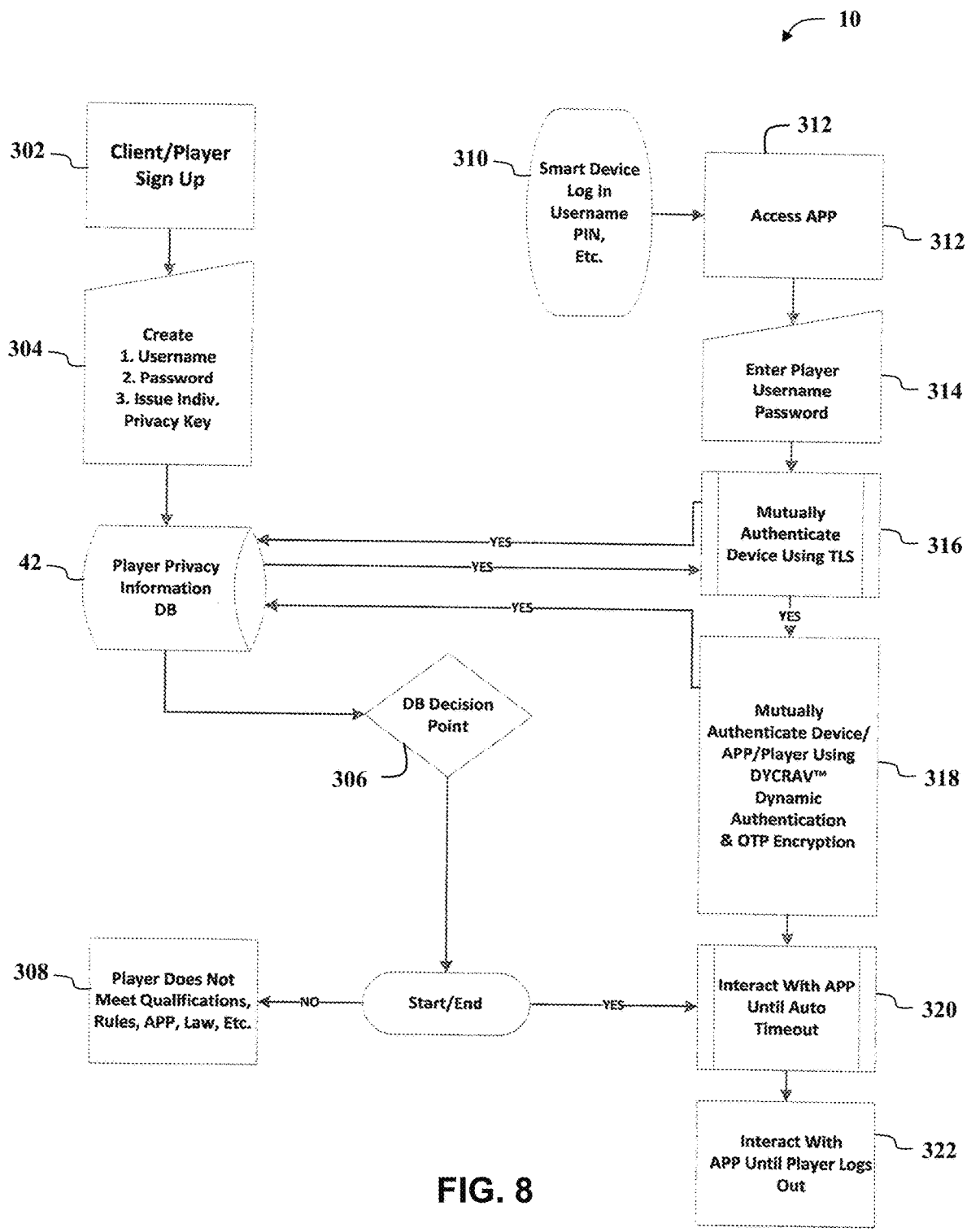
FIG. 8 is a flowchart of a method, according to the present invention, that may be used with the system shown in FIG. 1.

Referring to FIG. 8, a flowchart of one embodiment of a method 300, according to the present invention, that may be used with the system 10 for providing encrypted and decrypted digital data between users. The method 300 includes a plurality of steps. Each method step may be performed independently of, or in combination with, other method steps. Portions of the method may be performed by any one of, or any combination of, the components of the system 10.

In method step 302, the system 10 allows a client/player to sign-up for the system 10. In method step 304, the client/player is able to create a user profile 48. The user profile 48 includes a username, password, and is issued an individual PrivaKey/ChannelKey 56. The player information is stored on the database 42. Once the user profile 48 has been created, in method step 306 the database 42 determines whether the user profile qualifies to send and receive secure digital data messages 74. If the user profile 42 does not meet the qualifications, in method step 308, the system 10 will not allow the user to send and receive secure digital data messages 74.

In method step 310, the system 10 may receive a smart device or user computing device 14 log-in. The user may log-into the user computing device 14 to access the system 10. In method step 312, the user profile 48 is entered. In method step 314, the system 10 sends the username and password associated with the user profile 48 to the database 42 to be authenticated.

In method step 315, the user profile 48 has been authenticated via the database 42. Once activated, in method step 318, the system 10 mutually authenticates the device via the application server 38. In method step 320, the user profile interacts with the application server 38 until the user times out of the application. Once the user has timed out of the application server 38, in method step 322, the system 10 may log the player out of the application server 38.

Figure 10:
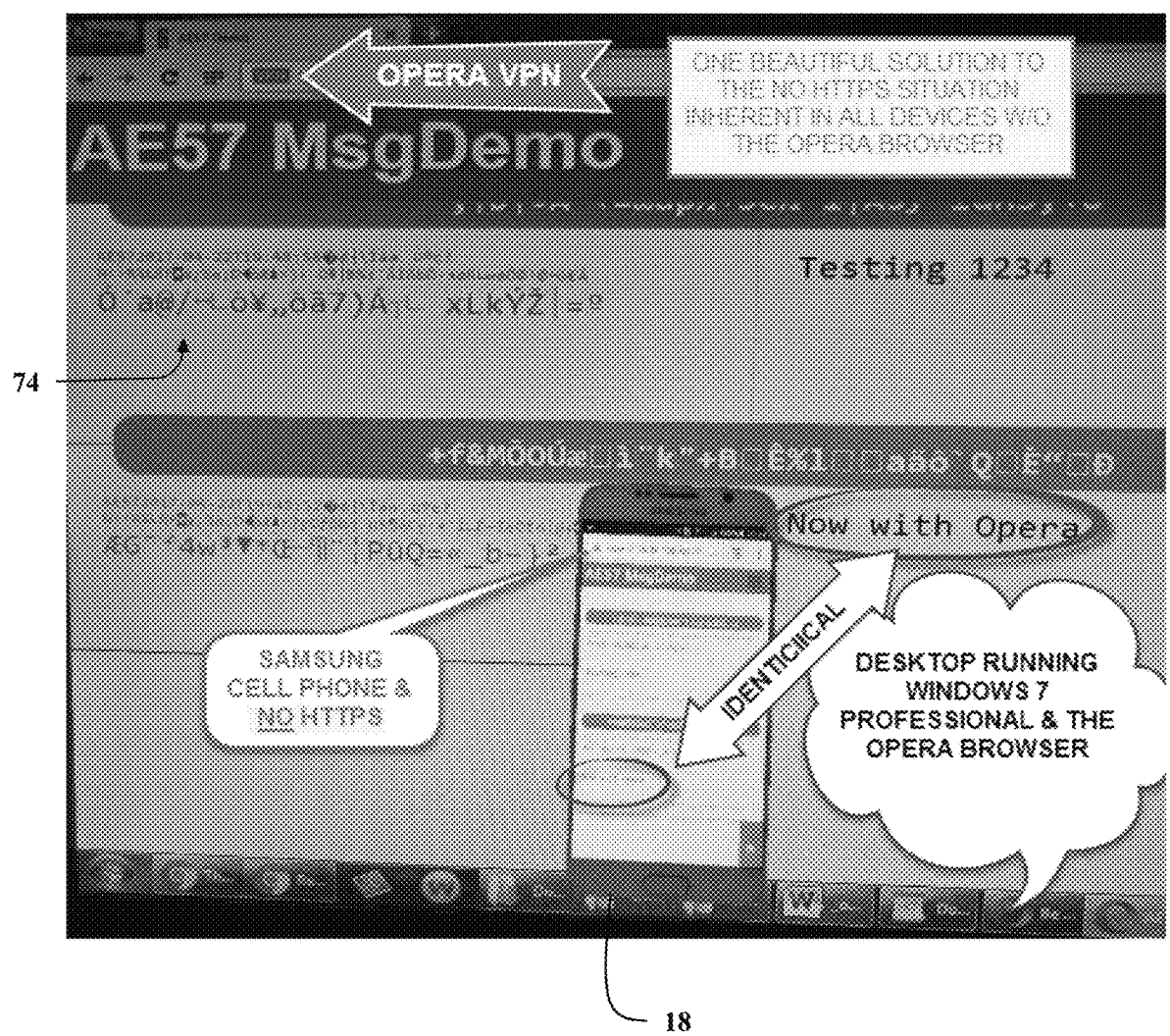
Figure 11:
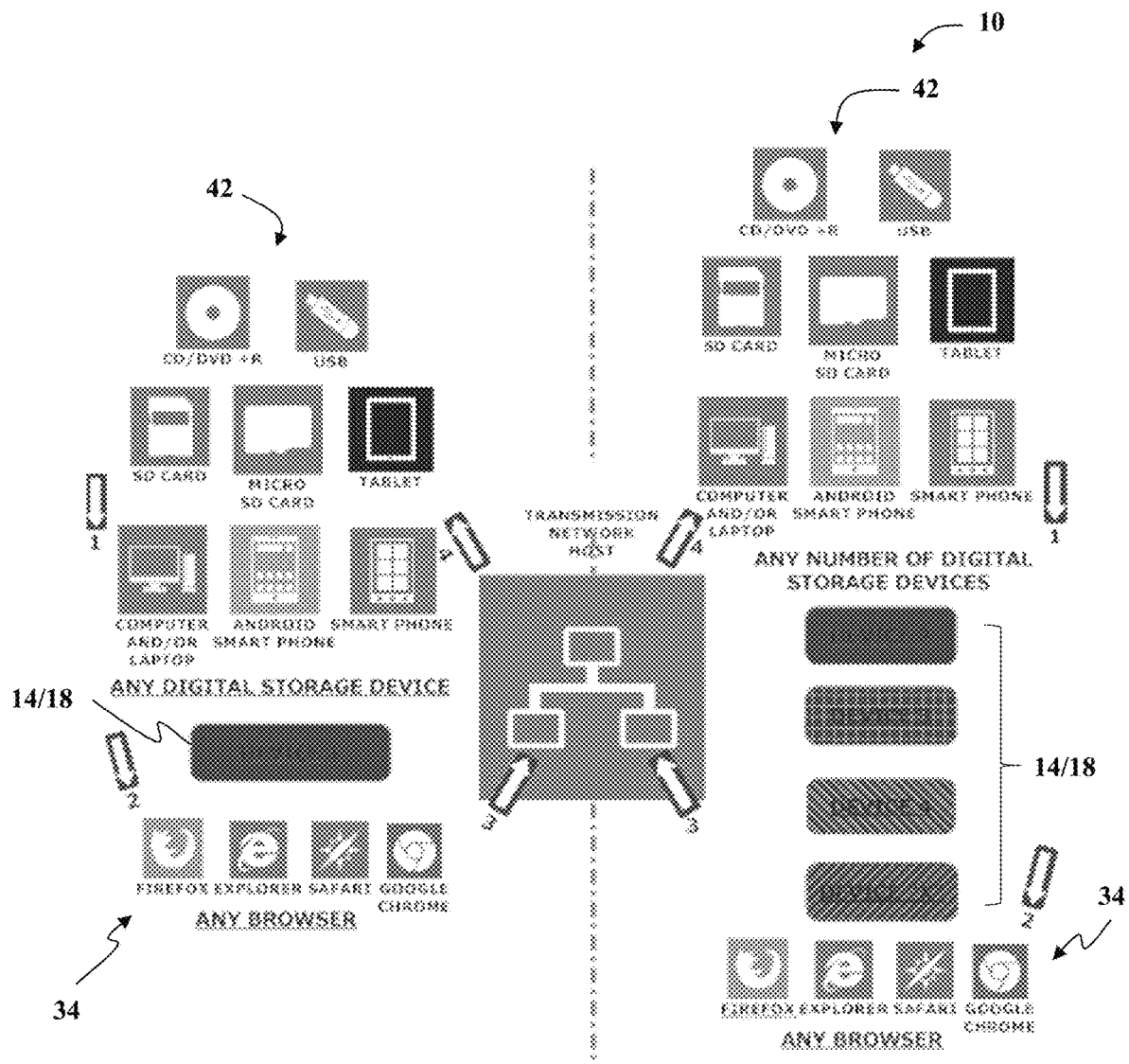

FIG. 10 shows an example of what the encrypted digital data message 74 looks like using the mobile user computing device 18. FIG. 11 shows the individual set-up of a user device utilizing the system 10. The system 10 allows multiple users to send digital data messages 74 back and forth using user computing device 14/18 over any internet browser 34.

Figure 12:
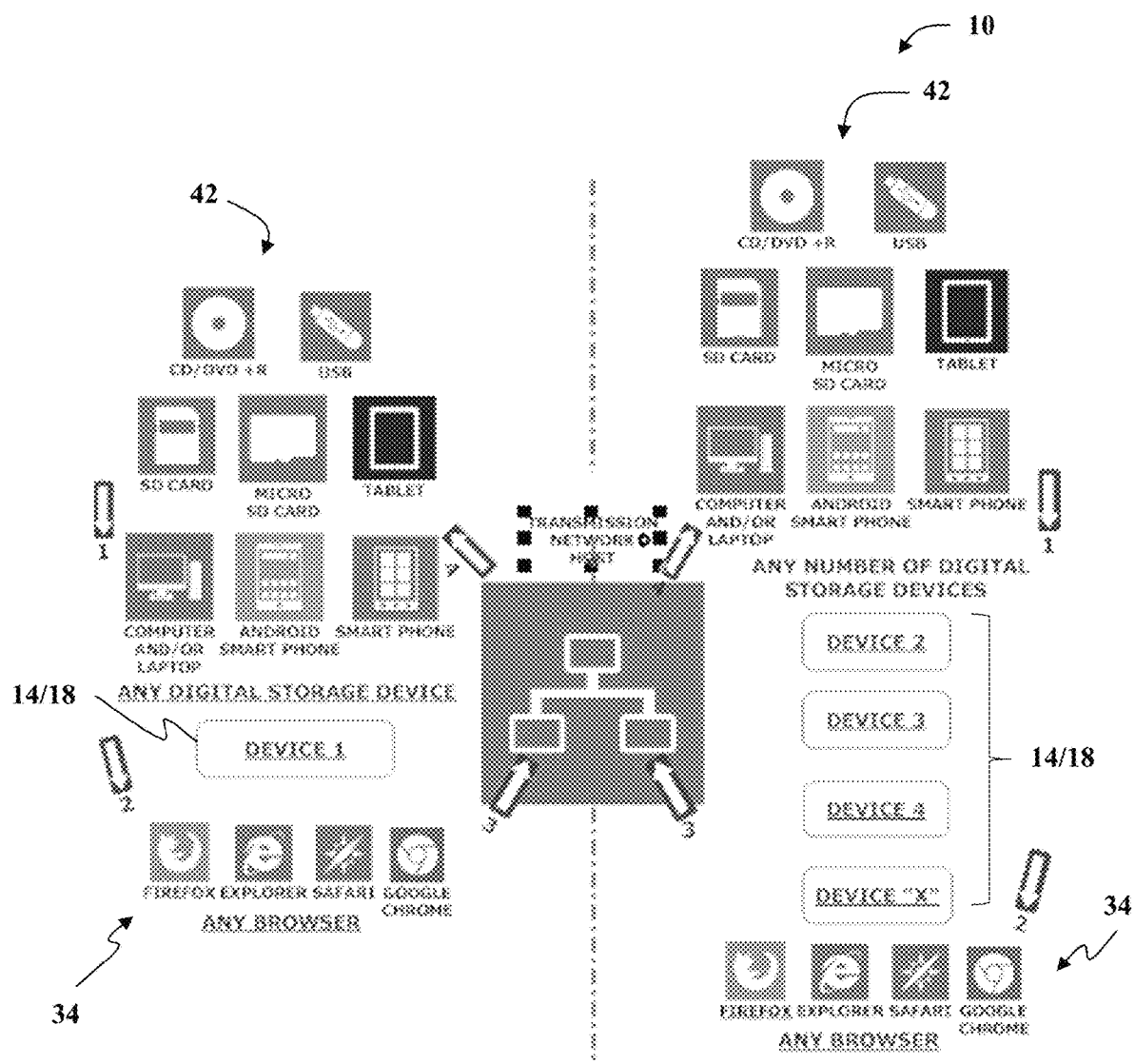

In yet another embodiment, as shown in FIG. 12, the user on any type of device 14/18 selects a desired browser 34. The browser is tasked to contact/connect to a network host (URL). The user is individually pre-assigned a username and password ($1^{st}$ factor) which completes the $1^{st}$ authentication procedure. The user then self-selects a dynamic authentication and completes the authentication ($2^{nd}$ factor) successfully. The user is then ready for any type of OTU secure digital data exchange.

Figure 13:
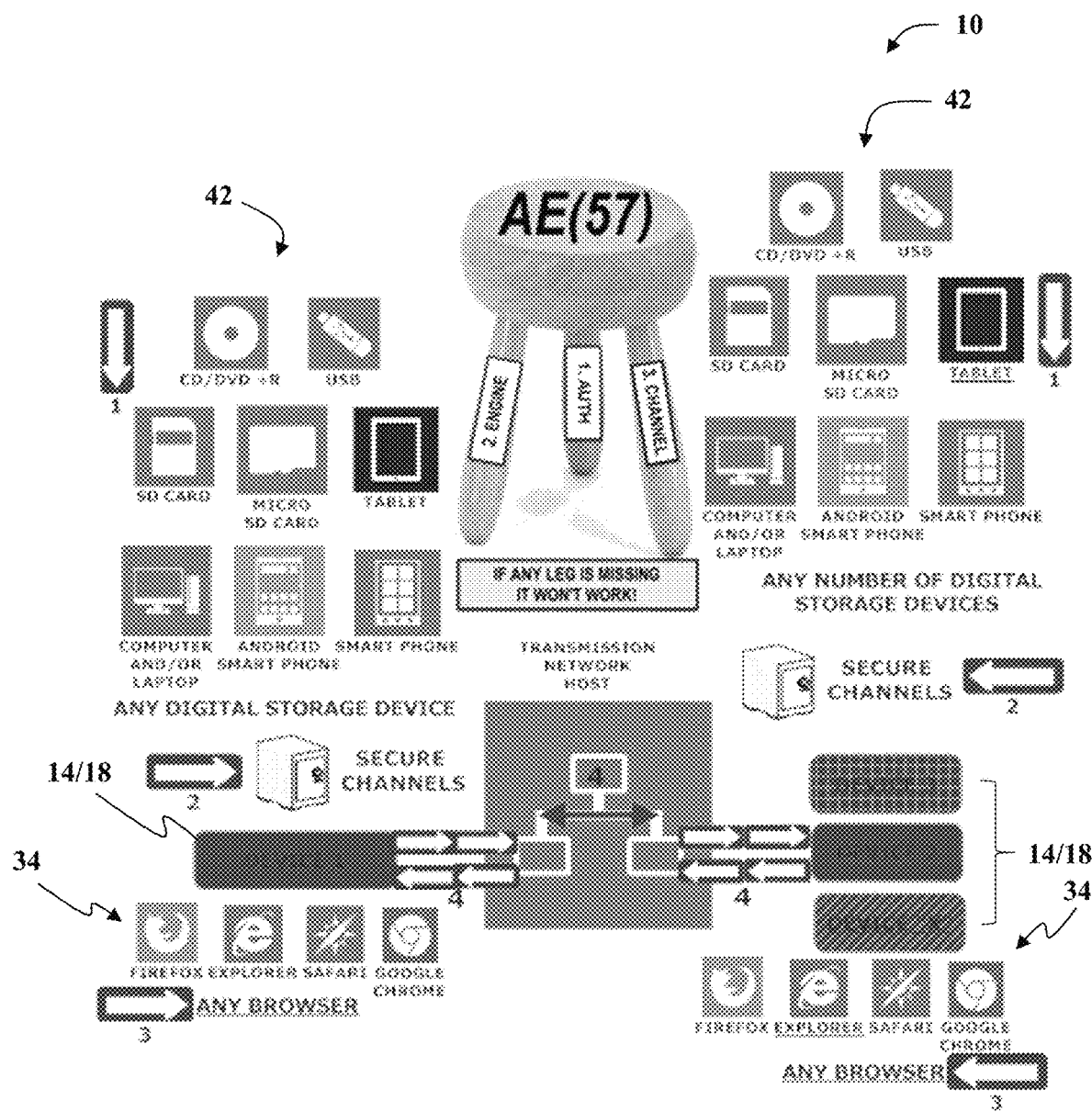

In another embodiment, illustrated in FIG. 13, the system 10 allows each device to be separate and standalone. Each device is connected to an individual (selectable) PrivaKey/ChannelKey 56. The user device may utilize any browser for the system 10. The secure digital data exchange may be used through identical PrivaKeys/ChannelKeys 56.

Figure 14:
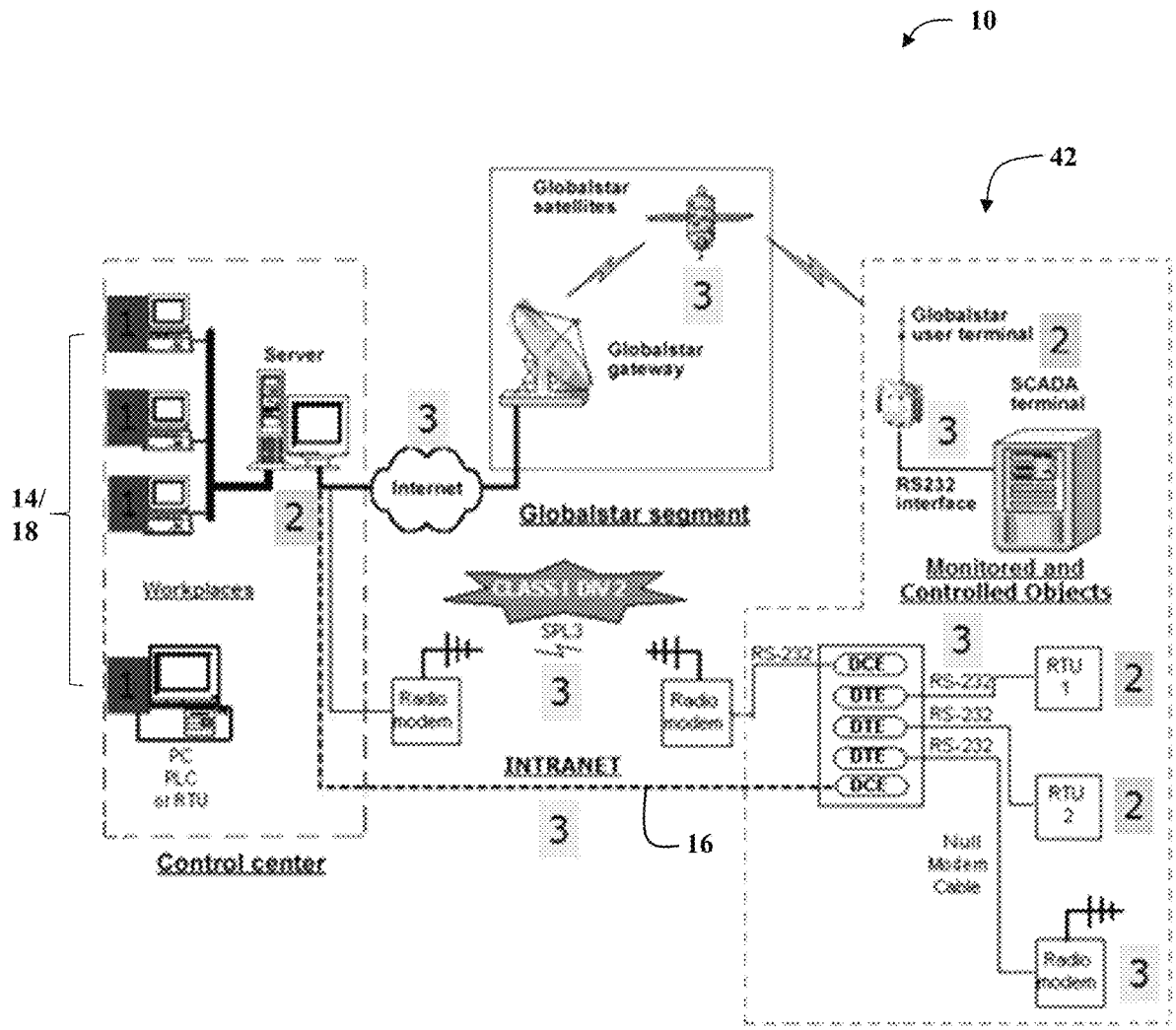

In one embodiment, illustrated in FIG. 14, the Dycrav dynamic authentication is required at step 1, the Dycrav PrivaKey/ChannelKey 56 installation is required at step 2, and the Dycrav OTU encryption/decryption protocol is invoked in transit at step 3. The system 10 uses the communication network 16 to send and receive information between the user computing devices 14/18 and the application server 38. In another embodiment, the system 10 uses the communication network 16 to send and receive information between the user computing devices 14/18 and the database 42.

In one embodiment, the system 10 may be used for drones, trains, automobiles, and/or gaming machines or games played over communications network, for example, a casino craps game. In addition, the TAO of digital communication for banking systems may be used. The international secure exchange of monetary funds used by institutions of off-shore bank account may utilize the system 10. The user accesses TAO dynamically via authentication. The account is secure with a dynamic SE digital certificate which is created by TAO. The user also utilizes the 32 character dynamic authentication to secure the bank account. Then, the system 10 uses the PrivaKey/ChannelKey 56 to further secure the account and send data.

Figure 15:
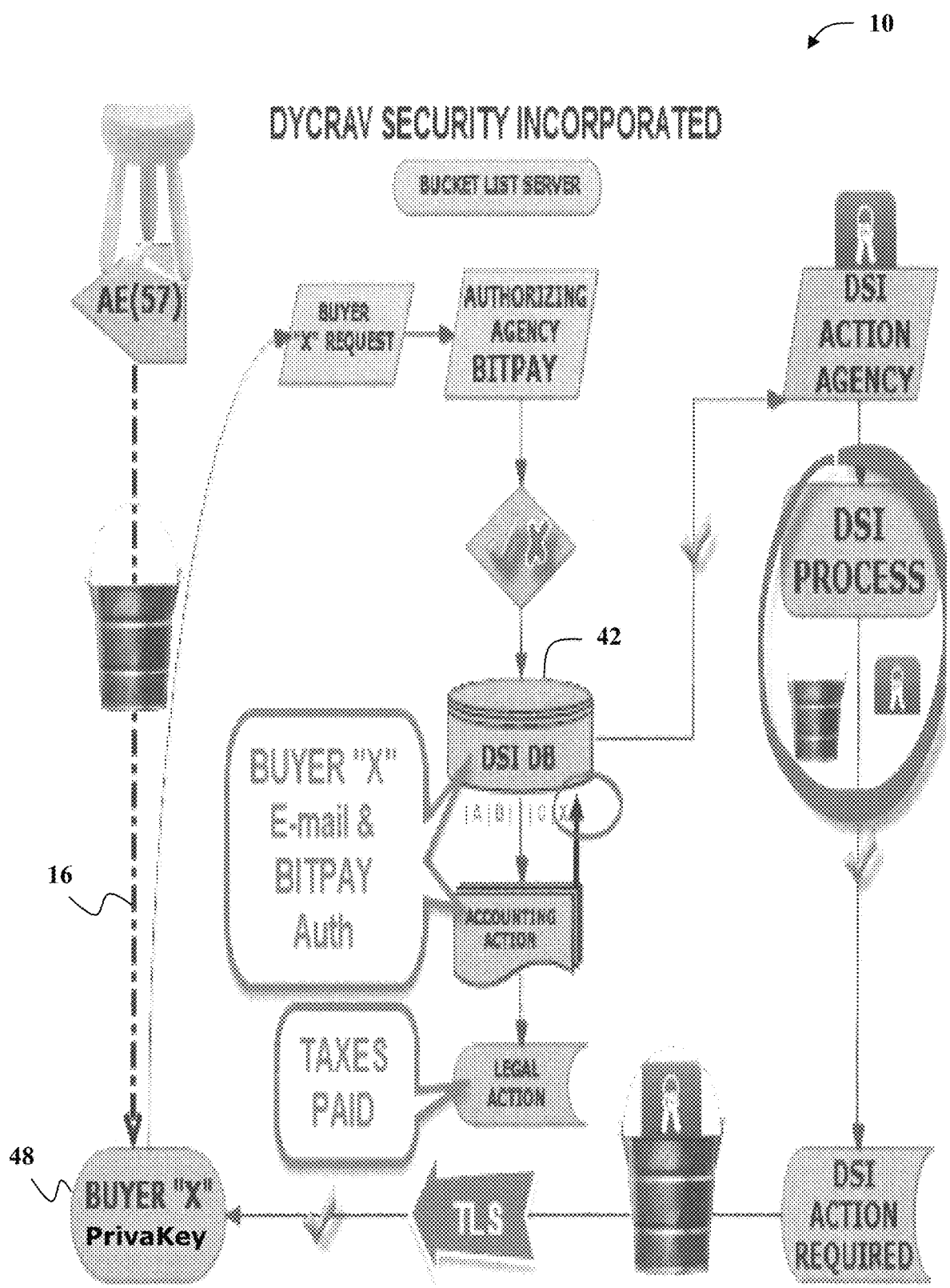
Figure 16:
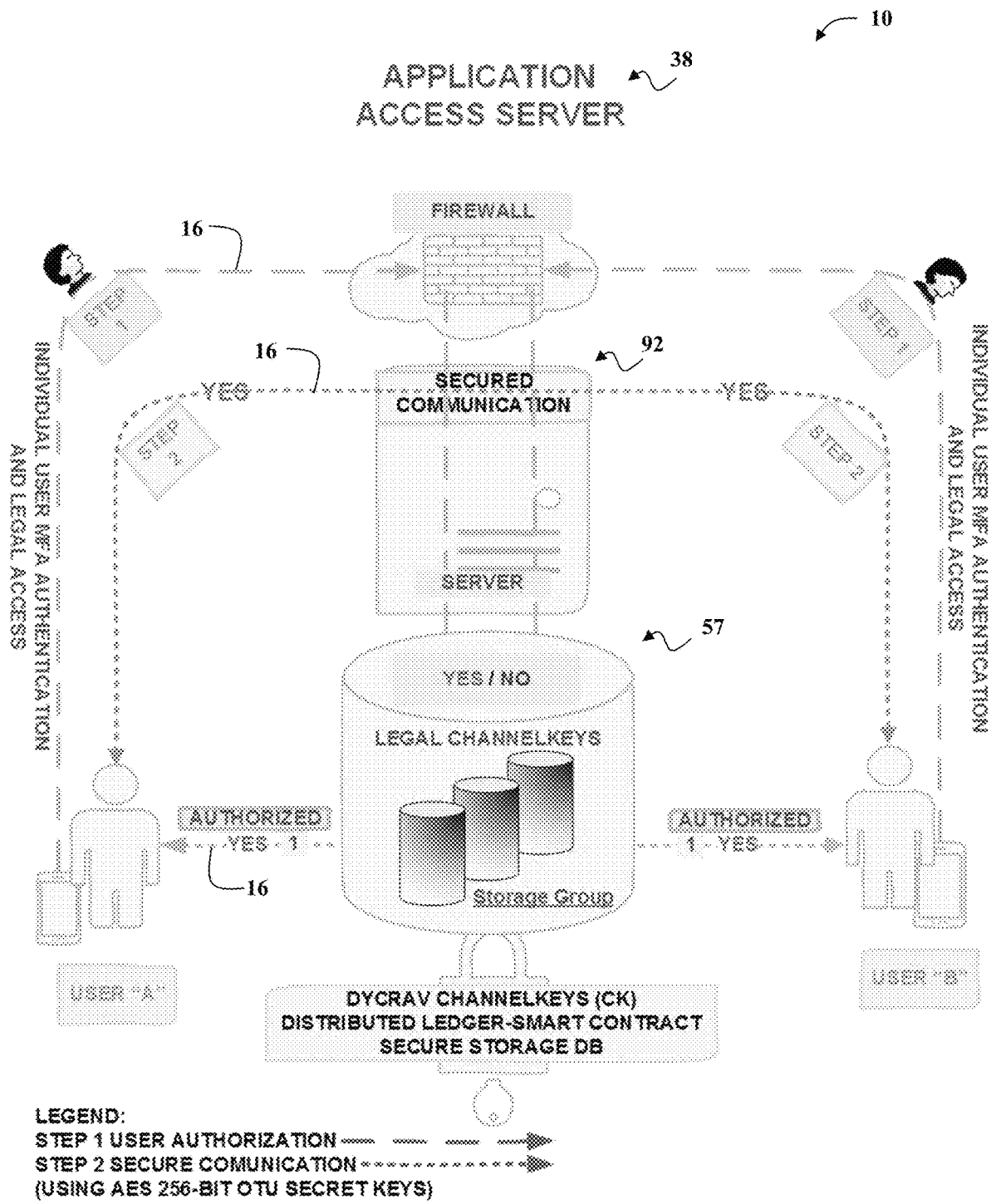

In another embodiment, illustrated in FIG. 15, the system 10 displays the smart contract authentication of the user profile 48 and PrivaKey/ChannelKey 56 purchase by each user. As illustrated in FIG. 16, the application server 38 authenticates user A and user B separately. The application server 38 is then programmed to authorize user A and user B through the smart contract. Both user A and user B must be on the same legal channel in order to move onto step 2 of the system 10. At step 2, the application server 38 is programmed to allow secure communication once both user A and user B have been authorized. The communication between the users A and B uses AES 256-BIT OTU secret keys 92.

A controller, computing device, server or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, the database 42, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBXX, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A system for transmitting and receiving digital data comprising:
 a processor coupled to a memory device;
 a database including a plurality of user records:
  wherein each of the user records includes a plurality of user profiles,
  wherein each of the user profiles includes a unique user ID and a unique password associated with the user ID to authenticate at least one of the user profiles, and
  wherein each of the user profiles is associated with at least one unique PrivaKey/ChannelKey; and
 an application server programmed to execute a program including the steps of:
  verifying a first user profile and a second user profile, wherein the first user profile includes a first user ID and a first password to authenticate the first user profile and the second user profile includes a second user ID and a second password to authenticate the second user profile;
  authenticating the first user profile and the second user profile;
  receiving a PrivaKey/ChannelKey associated with the first user profile and the second user profile, wherein the first user profile and the second user profile are further authenticated via the PrivaKey/ChannelKey;
  automatically encrypting a plurality of digital data sent from the first user profile to the second user profile, wherein the encrypted digital data includes the PrivaKey/ChannelKey and a ReciKey, wherein the ReciKey includes a secret key;
  sending the encrypted digital data to the second user profile from the first user profile using the secret key;
  rebuilding the secret key from the ReciKey to prepare the encrypted digital data;
  upon rebuilding the secret key, automatically decrypting the encrypted digital data; and
  displaying the decrypted digital data for the second user profile.

2. The system of claim 1, wherein the first user profile and the second user profile are logged into the system at the same time to send and receive the digital data.

3. The system of claim 1, wherein the application server is further configured to receive at least one of the dynamically authenticated first and second user profiles using an unique dynamic user authentication access code.

4. The system of claim 1, wherein the application server is receives a random number generated secret key, wherein the secret key is a one-time-use (OTU) key.

5. The system of claim 1, wherein the PrivaKey/ChannelKey utilizes Blockchain in each authentication, verification, sale, transaction, and accounting.

6. The system of claim 1, wherein the system may be implemented on a user interface that includes a unique user ID and a unique password.

7. The system of claim 6, wherein the first user profile utilizes a first user interface and the second user profile utilizes a second user interface that is different than the first user interface.

8. The system of claim 1, wherein the digital data is one of a text message, a SMS message, a graphic, a file, a streaming audio file, and a video file.

9. A method for transmitting and receiving digital data, the method comprising the steps of:
 accessing a database including a plurality of user records, wherein each of the user records includes a plurality of user profiles, wherein each of the user profiles includes a unique user ID and a unique password associated with the user ID to authenticate at least one of the user profiles, and wherein each of the user profiles is associated with at least one unique PrivaKey/ChannelKey;
 verifying a first user profile and a second user profile, wherein the first user profile includes a first user ID and a first password to authenticate the first user profile and the second user profile includes a second user ID and a second password to authenticate the second user profile;
 authenticating the first user profile and the second user profile;
 receiving a PrivaKey/ChannelKey associated with the first user profile and the second user profile, wherein the first user profile and the second user profile are further authenticated via the PrivaKey/ChannelKey;
 automatically encrypting a plurality of digital data sent from the first user profile to the second user profile, wherein the encrypted digital data includes the PrivaKey/ChannelKey and a ReciKey, wherein the Recikey includes a secret key;
 sending the encrypted digital data to the second user profile from the first user profile using the secret key;
 rebuilding the secret key from the ReciKey to prepare the encrypted digital data;
 upon rebuilding the secret key, automatically decrypting the encrypted digital data; and
 displaying the decrypted digital data for the second user profile.

10. The method as set forth in claim 9, wherein the first user profile and the second user profile are logged into the system at the same time to send and receive the digital data.

11. The method as set forth in claim 9, further comprising the steps of receiving the first and/or second user profiles using an unique dynamic authentication access code.

12. The method as set forth in claim 9, further comprising the steps of receiving a random number generated secret key, wherein the secret key is a one-time-use (OTU) key.

13. The method as set forth in claim 9, wherein the PrivaKey/ChannelKey utilizes Blockchain in each authentication, verification, sale, transaction, and accounting.

14. The method as set forth in claim 1, wherein the system may be implemented on a user interface that includes a unique user ID and a unique password.

15. The method as set forth in claim 14, wherein the first user profile utilizes a first user interface and the second user profile utilizes a second user interface that is different than the first user interface.

16. The method as set forth in claim 9, wherein the digital data is one of a text message, a SMS message, a graphic, a file, a streaming audio file, and a video file.

17. One or more non-transitory computer-readable storage media, having computer executable instructions embodied thereon, where when executed by at least one processor, the computer-executable instructions cause the processor to execute a program including the steps of:
   accessing a database including a plurality of user records:
      wherein each of the user records includes a plurality of user profiles,
      wherein each of the user profiles includes a unique user ID and an unique password associated with the user ID to authenticate at least one of the user profiles, and
      wherein each of the user profiles is associated with at least one unique PrivaKey/ChannelKey;
   verifying a first user profile and a second user profile, wherein the first user profile includes a first user ID and a first password to authenticate the first user profile and the second user profile includes a second user ID and a second password to authenticate the second user profile;
   authenticating the first user profile and the second user profile;
   receiving a PrivaKey/ChannelKey associated with the first user profile and the second user profile, wherein the first user profile and the second user profile are further authenticated via the PrivaKey/ChannelKey;
   automatically encrypting a plurality of digital data sent from the first user profile to the second user profile, wherein the encrypted digital data includes the PrivaKey/ChannelKey and a ReciKey, wherein the ReciKey includes a secret key;
   sending the encrypted digital data to the second user profile from the first user profile using the secret key;
   rebuilding the secret key from the ReciKey to prepare the encrypted digital data;
   upon rebuilding the secret key, automatically decrypting the encrypted digital data; and
   displaying the decrypted digital data for the second user profile.

18. One or more non-transitory computer-readable storage media as set forth in claim 17, wherein the first user profile and the second user profile are logged into the system at the same time to send and receive the digital data.

19. One or more non-transitory computer-readable storage media as set forth in claim 17, wherein the PrivaKey/ChannelKey utilizes Blockchain in each authentication, verification, sale, transaction, and accounting.

20. One or more non-transitory computer-readable storage media as set forth in claim 17,
   wherein the system may be implemented on a user interface that includes a unique user ID and a unique password; and
   wherein the first user profile utilizes a first user interface and the second user profile utilizes a second user interface that is different than the first user interface.

* * * * *